United States Patent
Liebman

(10) Patent No.: US 8,751,604 B2
(45) Date of Patent: *Jun. 10, 2014

(54) MEDIA FILE ACCESS AND STORAGE SOLUTION FOR MULTI-WORKSTATION/MULTI-PLATFORM NON-LINEAR VIDEO EDITING SYSTEMS

(76) Inventor: Andrew Liebman, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,149

(22) Filed: Aug. 13, 2012

(65) Prior Publication Data

US 2013/0124690 A1    May 16, 2013

Related U.S. Application Data

(63) Continuation of application No. 11/403,036, filed on Apr. 12, 2006, now Pat. No. 8,266,283, which is a continuation-in-part of application No. PCT/US2005/008968, filed on Mar. 18, 2005.

(60) Provisional application No. 60/554,272, filed on Mar. 18, 2004.

(51) Int. Cl.
  *G06F 15/16* (2006.01)
  *G06F 12/00* (2006.01)
  *G06F 17/30* (2006.01)

(52) U.S. Cl.
  USPC ............................. 709/217; 707/828; 707/831

(58) Field of Classification Search
  USPC ........... 709/219, 217; 707/783–784, 828, 831
  See application file for complete search history.

(56) References Cited

U.S. PATENT DOCUMENTS

| | | | |
|---|---|---|---|
| 5,649,200 | A | 7/1997 | Leblang et al. |
| 5,706,510 | A | 1/1998 | Burgoon |
| 5,883,670 | A | 3/1999 | Sporer et al. |

(Continued)

FOREIGN PATENT DOCUMENTS

| | | |
|---|---|---|
| WO | WO 99/26170 | 5/1999 |
| WO | WO 2005/089446 | 9/2005 |
| WO | WO 2009/155578 | 12/2009 |

OTHER PUBLICATIONS

Non-Final Office Action for U.S. Appl. No. 12/999,964, dated Jun. 18, 2013.

(Continued)

*Primary Examiner* — Shirley Zhang
(74) *Attorney, Agent, or Firm* — Sean D. Detweiler, Esq.; Morse, Barnes-Brown & Pendleton, P.C.

(57) ABSTRACT

A computer implemented method and system manages digital media files in a non-linear video editing system. A user may store digital media files in a user directory. If an instruction is received to move a first digital media file from the user directory to a shared directory having a location that is not directly accessible to the user, such move occurs, thereby preventing direct access by the user to the first digital media file. A link is generated in the user directory to the first digital media file, the link providing the user indirect access to the first digital media file located in the shared directory. If the link to the first digital media file is deleted from the user directory, the first digital media file is not deleted from the shared directory until the system subsequently receives an additional instruction to delete files corresponding with previously deleted links.

22 Claims, 30 Drawing Sheets

(56) References Cited

U.S. PATENT DOCUMENTS

| | | | |
|---|---|---|---|
| 6,044,374 | A | 3/2000 | Nesamoney et al. |
| 6,091,778 | A | 7/2000 | Sporer et al. |
| 6,167,083 | A | 12/2000 | Sporer et al. |
| 6,195,650 | B1 | 2/2001 | Gaither et al. |
| 6,230,185 | B1 | 5/2001 | Salas et al. |
| 6,301,105 | B2 | 10/2001 | Glorioso et al. |
| 6,321,219 | B1 | 11/2001 | Gainer et al. |
| 6,337,880 | B1 | 1/2002 | Cornog et al. |
| 6,389,433 | B1 * | 5/2002 | Bolosky et al. ............... 707/749 |
| 6,457,021 | B1 | 9/2002 | Berkowitz et al. |
| 6,469,711 | B2 | 10/2002 | Foreman et al. |
| 6,519,571 | B1 | 2/2003 | Guheen et al. |
| 6,584,152 | B2 | 6/2003 | Sporer |
| 6,628,303 | B1 | 9/2003 | Foreman et al. |
| 6,768,996 | B1 | 7/2004 | Steffens et al. |
| 6,996,588 | B2 | 2/2006 | Azagury et al. |
| 7,028,262 | B2 | 4/2006 | Estrada et al. |
| 7,069,594 | B1 | 6/2006 | Bolin |
| 7,124,366 | B2 | 10/2006 | Foreman et al. |
| 7,293,033 | B1 * | 11/2007 | Tormasov et al. ............. 707/608 |
| 7,610,219 | B2 | 10/2009 | Sayed |
| 7,783,665 | B1 * | 8/2010 | Tormasov et al. ............. 707/783 |
| 2001/0006453 | A1 | 7/2001 | Glorioso et al. |
| 2001/0014892 | A1 | 8/2001 | Gaither et al. |
| 2001/0024472 | A1 | 9/2001 | Sporer et al. |
| 2001/0040592 | A1 | 11/2001 | Foreman et al. |
| 2001/0051955 | A1 | 12/2001 | Wong |
| 2002/0073144 | A1 | 6/2002 | Katoh et al. |
| 2002/0138843 | A1 | 9/2002 | Samaan et al. |
| 2002/0149618 | A1 | 10/2002 | Estrada et al. |
| 2002/0165856 | A1 | 11/2002 | Gilfillan et al. |
| 2003/0095789 | A1 | 5/2003 | Wakimoto et al. |
| 2003/0097276 | A1 | 5/2003 | Kirkland |
| 2003/0227487 | A1 | 12/2003 | Hugh |
| 2004/0002990 | A1 * | 1/2004 | Sander et al. ................. 707/102 |
| 2004/0049520 | A1 * | 3/2004 | Bowers et al. ............. 707/104.1 |
| 2004/0056882 | A1 | 3/2004 | Foreman et al. |
| 2004/0066395 | A1 | 4/2004 | Foreman et al. |
| 2004/0071441 | A1 | 4/2004 | Foreman et al. |
| 2004/0088313 | A1 | 5/2004 | Torres |
| 2004/0199578 | A1 | 10/2004 | Kapczynski et al. |
| 2005/0086296 | A1 | 4/2005 | Chi et al. |
| 2005/0091289 | A1 | 4/2005 | Shappell et al. |
| 2006/0026213 | A1 | 2/2006 | Yaskin et al. |
| 2006/0053442 | A1 | 3/2006 | Ridderheim et al. |
| 2006/0092178 | A1 | 5/2006 | Tanguay et al. |
| 2006/0184673 | A1 | 8/2006 | Liebman |
| 2007/0011304 | A1 | 1/2007 | Error |
| 2007/0022215 | A1 | 1/2007 | Singer et al. |
| 2007/0078768 | A1 | 4/2007 | Dawson |
| 2007/0094601 | A1 | 4/2007 | Greenberg et al. |
| 2008/0256242 | A1 | 10/2008 | Liebman |
| 2009/0037520 | A1 | 2/2009 | Loffredo |
| 2011/0167036 | A1 | 7/2011 | Liebman |

OTHER PUBLICATIONS

Björn Adamski, "MXF-Erweiterung für QuickTime," FKT Fernseh Und Kinotechnik, Fachverlag Schiele & Schon GMBH., Berlin, DE, 62(4): 2008.

Supplementary European Search Report for European Application No. 09731871.1, mailed Nov. 10, 2011.

International Search Report for International Application PCT/US2009/048056, dated Feb. 1, 2010.

Supplementary European Search Report for European Application No. 09767886, mailed Nov. 4, 2011.

Supplementary European Search Report for European Application No. 09731871.1, mailed Oct. 14, 2011.

International Search Report for International Application PCT/US2009/048056, dated Nov. 25, 2009.

Notice of Allowance for U.S. Appl. No. 11/403,036, dated Apr. 23, 2012.

Notice of Allowance for U.S. Appl. No. 12/102,563, dated Mar. 9, 2010.

Non-Final Office Action for U.S. Appl. No. 11/403,036, dated May 14, 2009.

Non-Final Office Acction for U.S. Appl. No. 11/403,036, dated Sep. 23, 2010.

Non-Final Office Action for U.S. Appl. No. 12/999,964, dated Mar. 29, 2012.

Non-Final Office Action for U.S. Appl. No. 12/937,859, dated Mar. 19, 2012.

Final Office Action for U.S. Appl. No. 11/403,036, dated Mar. 11, 2010.

Final Office Action for U.S. Appl. No. 11/403,036, dated Mar. 1, 2011.

Final Office Action for U.S. Appl. No. 12/999,964, dated Oct. 22, 2012.

Final Office Action for U.S. Appl. No. 12/937,859, dated May 2, 2013.

Final Office Action for U.S. Appl. No. 12/999,964, dated Sep. 24, 2013.

* cited by examiner

MEDIA FILE ACCESS AND STORAGE SOLUTION FOR MULTI-WORKSTATION/MULTI-PLATFORM NON-LINEAR VIDEO EDITING SYSTEMS

CROSS-REFERENCE TO RELATE APPLICATIONS

This application is a continuation of U.S. application Ser. No. 11/403,036, filed on Apr. 12, 2006 now U.S. Pat. No. 8,266,283, which is a continuation-in-part of co-pending PCT Patent Application No. PCT/US05/08968, filed on Mar. 18, 2005, which claims priority in U.S. Provisional Patent Application Ser. No. 60/554,272 filed Mar. 18, 2004. The disclosure of application Ser. No. 11/403,036 is hereby incorporated by reference in its entirety.

BACKGROUND OF THE INVENTION

1. Field of the Invention

The present invention generally relates to centralized shared storage systems for collaborative non-linear editing and manipulation of digital video and audio files.

2. Description of the Prior Art

Non-linear video and audio editing systems (NLE's) that can perform random access on the source material are typically set up on independent computer workstations having a means to input digital or analog audio and video as well as software for editing the inputted audio and video.

In such systems, video and sound (e.g., for film and television production) are digitized, or otherwise digital video is imported into the computer for storage on a hard disk or other storage media. Subsequently, the digital-media can be manipulated with software such as, Avid's Xpress® Pro and Media Composer Adrenaline, Pinnacle's Liquid Edition, Apple's Final Cut Pro, Optibase's Media 100, Sony Vegas, Canopus Edius, and Adobe Premiere Pro. Various editing tasks can then be performed on the imported video before it is saved, exported to another medium, or encoded for transfer to other storage media, e.g., a CD or DVD.

While a given television or film production facility may have multiple NLE workstations, the digital media files that are stored and accessed by each NLE—video files, audio files, graphics, stills, etc.—typically reside locally on that workstations' internal hard drives or on external hard drives that are directly attached to the workstation.

Several manufacturers offer products that allow multiple NLEs (usually from the manufacturer's own product line) to be attached to a centralized storage network. Attaching NLEs to a common centralized storage network that every user and workstation can access vastly improves the efficiency of editing with NLEs and also allows a workflow that fosters collaboration and creativity. By storing media files in a centralized location, many editors can work simultaneously on the same project without having to duplicate the media files on each system. For example, in a news operation, a reporter can edit a story while an editor creates "coming up next promos" from the same material. In another example from the world of documentaries and feature films, new media files can be added to the system—captured—at one set of workstations while editors edit those files at another set of workstations. Similarly, one editor can tweak the sound for finished parts of the story while another editor works on parts of the story that still need to be edited. Thus, supervisors can review the work of subordinates while the subordinates continue working on a project. Furthermore, editors can use any workstation that's available—because the media files don't have to be directly attached to the workstation that happens to be available.

With all the advantages of attaching NLEs to a common centralized storage network, it would seem that every facility with two or more NLE systems would use centralized storage. However, the high cost of the currently available systems is a significant barrier for many owners of NLE systems. Furthermore, many commercial products that are marketed to provide centralized storage for collaborative editing and manipulation of video and audio files do not provide some key capabilities that users need.

Setting up a comprehensive and effective "home grown" centralized storage system is not a practical alternative in most cases, because shared media files must be stored in such a way that the files are managed and kept safe from accidental erasure and so that the NLE workstations accessing those files do not come into conflict with one another.

For instance, Avid® Technology's products such as Xpress Pro and Media Composer Adrenaline (both Windows and Macintosh versions) scan all the media files they can see on the various storage devices that are accessible to the workstation and then create a database of the clips—writing the database files to the very same folders where the media files are found. If multiple workstations try to access the same media files folder over a network, each workstation will try to rewrite the database files—sometimes causing workstations to crash or corrupt each other's projects. Additionally, the database files for Macintoshes begin with a "dot" (".") and the database files for Windows machines do not; thus, Macintoshes ignore the Windows database files, but Windows machines will try to quarantine—remove—the "dot" files because they're not recognized as belonging in the folder.

Another problem arises when capturing new media files onto a system using Xpress DV Xpress Pro, Adrenaline, etc. As new material is being captured from videotape, the digital audio and video media files are temporarily stored in a subfolder called "Creating" and are given temporary names until the capture process is finished. If two or more workstations were capturing at the same time, each workstation would be storing temporary files in the same "Creating" subfolder and trying to give those files the same name—thus, causing a conflict.

Avid® Technology products are not the only NLEs that present such centralized storage difficulties. When working on other industry leading NLEs such as Apple's Final Cut Pro and Adobe Premiere Pro, if multiple users attempt to read and write the same media files on a simple networked volume there is a serious danger that media files can be accidentally—or even maliciously—erased to the detriment of some or all members of the group.

It would be highly desirable, therefore, to provide an economical centralized storage solution that allows multiple users and workstations to access the same media files while avoiding the aforementioned problems of workstation crash, project file corruption, and accidental or malicious erasure of files.

It would further be highly desirable to provide a centralized storage solution that creates a layer of isolation between the multiple users and workstations, and between those users and workstations and the media files they need to manipulate, such that all users and workstations can add to and manipulate a common pool of media files, yet be unable to affect one another in any undesirable way. One way to accomplish this goal would be through utilization of the concept of "file virtualization"—in which a given actual media file can have many different names or locations on a filesystem, or in which given filename can actually stand for a different file or different filename.

It would further be highly desirable to provide a centralized storage solution that would allow incompatible NLEs from different manufacturers to be able to see and manipulate a common set of media files, even though the native names of the media files created by one brand of NLE might normally preclude competing NLEs from recognizing that those files are indeed media files that potentially could be manipulated by the competing brand of NLE. This cross-NLE compatibility could be greatly assisted by file virtualization as well—in which the same media file could have more than one name, each name being tailored so that it can be recognized by specific NLE applications.

File virtualization has been previously used to a limited extent in the context of NLEs accessing a common group of media files over a network, specifically in the case of Rorke Data, Inc.'s ImageSan product (http://www.rorke.com and in Tiger Technologie's Meta San product (http://www.metasan.com/). In both cases, these products use virtualization as a means to allow multiple Avid® NLE workstations to each create and access their own unique Media Database files and "Creating" folders from within each media file volume, without letting one Avid® NLE know that other Avid® NLEs have such database files and "Creating" folders there with the same exact names. In both cases, the virtualization aspect of these products involves "client side" software that performs a file- or directory-naming manipulation that is transparent to the NLEs. Thus, for example, when Workstation A attempts to write a certain file (for instance, a Media Database file) in the central location, client software renames that file so that it can coexist with other files that generally would also have the same name. In neither case does file- or directory-naming manipulation take place on the "server side". Moreover, these solutions only use virtualization in the context of Avid® NLEs, and only for this very limited purpose of allowing multiple Avid® Media Database files and multiple Avid® "Creating" folders to coexist in the same volume so that multiple Avid® editors will not come into conflict with each other as they access the same media volumes (storage spaces).

Moreover, while the use of file "virtualization" has been suggested in the patent literature (see, e.g., United States Patent Publication Nos. 2003/0097276 and 2004/0199578), U.S. Pat. No. 6,195,650, describes the use of symbolic links only as part of a client side solution.

It would thus be highly desirable to provide a centralized collaborative storage system for non-linear editing systems and other devices (e.g., encoders and hardware or software that can record, playback, and/or access digital media files over a network) having a centralized storage media for storing and enabling manipulation of digital video media that implements a server-side solution that enables the linking up of multiple video editing workstations implementing various NLE application platforms and other devices while avoiding the aforementioned problems.

It would further be highly desirable to provide as part of a centralized collaborative storage system a means to allow multiple non-linear editing systems to safely open up and work from and collaborate on the same "Project". In the world of non-linear editing, Projects are generally understood to encompass "metadata" that refers to media files and not the media files themselves. In their most basic form, Projects include "clips" that refer to entire media files, "subclips" that refer to parts of media files, and "sequences" that refer to media files (in part or in their entirety) all strung together to make a story or program". In the context of non-linear video editing, the creative work of an editor is generally stored in the Project. Unlike media files, which are typically never modified in the course of editing, Project files are changing all the time because they reflect the editing decisions of an editor. The normal practice of editors therefore is to each maintain their own Projects, because if two or more editors were to open up the same Project from two different non-linear editing workstations (assuming the Project was stored in some central location that could be accessed by more than one editor), one editor would be at great risk for overwriting the changes that others are making, and vice versa. The risk of overwriting changes applies to any information contained in the Project, including settings, bins, sequences, etc. Also, if multiple editors were to open up the same Project file, they would all be confronted with a clutter of information that made it hard to sort out what was being edited by which editor, and who should have modification authority over which metadata.

It would therefore further be highly desirable to provide a centralized collaborative storage system for non-linear editing systems that manages ownership and permissions over different editors' contributions to shared Projects and that implements "symbolic links" to create a virtual file and folder structure that allows multiple non-linear editing systems to collaborate on the same project, keeping work organized so that it is clear which editor is editing what and allowing each editor to maintain his/her own settings for the Project.

SUMMARY OF THE INVENTION

It is thus an object of the present invention to provide a centralized collaborative storage system for non-linear editing systems and other devices (e.g., encoders and hardware or software that can record, playback, and/or access digital media files over a network), a method and computer program product for accessing digital media files stored in a centralized storage media that avoids the aforementioned problems of workstation crash and project file corruption when multiple users access each other's projects.

It is therefore an object of the present invention to provide a centralized collaborative storage system for non-linear editing systems and other devices (e.g., encoders and hardware or software that can record, playback, and/or access digital media files over a network), a method and computer program product that eliminates the problems existent in non-linear video editing systems (NLEs) on the common Windows and Macintosh platforms.

It is a further object of the present invention to provide a novel centralized collaborative storage system for non-linear editing systems and other devices (e.g., encoders and hardware or software that can record, playback, and/or access digital media files over a network), a method and computer program product that implements a file virtualization feature that enables a server to permit multiple NLE workstations and other devices to see and access the same media files (video, audio, graphics, etc.) stored in a central storage media while essentially keeping each workstation and other devices isolated from the others (i.e., unaware that the others exist).

It is a further object of the present invention to provide a novel centralized collaborative storage system for non-linear editing systems and other devices (e.g., encoders and hardware or software that can record, playback, and/or access digital media files over a network), a method and computer program product that implements a server side file virtualization feature that enables a server to permit multiple NLE workstations and other devices to see and access the same media files.

In accordance with these objects, the present invention provides a centralized collaborative storage system for non-linear editing systems and other devices that implements a server side file virtualization feature that enables a server to permit multiple NLE workstations and other devices to see and access the same media files (video, audio, graphics, etc.) stored in a central storage media while essentially keeping each workstation and other devices isolated from the others (i.e., unaware that the others exist).

The solution of the present invention is built upon a unique usage of an underlying feature of the Linux Operating System (and also found in other Unix or Unix-like Operating Systems such as Mac OS-X)—that being the ability of these Operating Systems to create pointers or "links" to files (both "symbolic links" and "hard links"). The inventive system makes extensive use of such links to provide to each workstation that is connected to the server and its centralized storage easy and safe access to shared media files. In essence, the system virtualizes all media files that are designated to be accessible to more than one user and workstation, presenting "links" to the actual files to all workstations and users that are connected to the server (via each user or workstation's own unique directories and network shares), while protecting the actual media files in a completely separate directory that cannot be directly accessed by those users and workstations. That is, "symbolic links" create virtual files that are unique for each user on the system but that point to a common set of true media files that are stored on the networked drive in a folder that ordinarily is never accessed directly by any NLE workstations. From the point of view of the NLEs, these links are indistinguishable from the actual media files—and thus all operations that the NLE would and could normally perform on those files can be performed (even file deletion). However, because the files are really only links, the actual files are at all times protected.

The approach of virtualizing all shared media files in this manner also enables different NLE applications to share media files over a network. File virtualization—in which the same media file could have more than one name, each name being tailored so that it can be recognized by specific NLE applications—enables this cross-NLE compatibility.

Preferably, the software solution is platform and brand independent on the workstation side of the equation. The only necessity is a Linux (or, equivalently, a Unix or Unix-like) based server. That is, all of the digital video media data file manipulation takes place on the server side in a platform independent manner, thus, allowing many different kinds of editing systems and other devices running on many different platforms to share the same storage space.

In accordance with the foregoing objects and aspects of the invention, there is provided a system, method and computer program product for storing digital audio and video media files in a system having a computer server that is in communication with a means for storing the media files, and that is in communication with one or more independent users. The method comprises the steps of: creating a directory structure on the storage means for hierarchically organizing the digital media and other data files; generating in the directory structure a User Directory that corresponds to each independent user that is capable of accessing the media files, and through which an independent user can store actual digital media files; moving actual stored digital media files from a User Directory to a Shared Directory that is separate from the User Directory where the files are not directly accessible to any independent user; and, creating, for each digital media file moved into the Shared Directory, a corresponding link to the actual digital media file for each individual independent user, and placing the link inside each the corresponding User Directory. In this manner, via the links, a user is permitted indirect access to all actual digital media files that are stored in the Shared Directory on the storage means, while preventing direct access to the actual digital media files According to a further aspect of the invention, there is provided a complete tool for managing, via a Graphical User Interface (GUI), a centralized digital media storage system that stores digital media source data and edited data for multiple NLE workstations that implements the symbolic links virtualization feature. This managing tool enables media and corresponding virtual files to be manipulated, e.g., created in a logical location, moved from one logical location to another, shared, refreshed, and deleted in response to user requests, all the while automatically retaining the file virtualization features as described.

It is a further object of the present invention to provide a tool that manages ownership and permissions over different editors' contributions to shared Projects and that implements "symbolic links" to create a virtual file and folder structure that allows multiple non-linear editing systems to collaborate on the same project, keeping work organized so that it is clear which editor is editing what and allowing each editor to maintain his/her own settings for the Project. Further to this object, the tool implements the "symbolic links" virtualization feature to create a virtual file and folder structure for enabling: 1) Multiple editors to open and work with the same shared Non-linear Editing Project when the project is created and shared within a framework established by the tool's manager software; 2) Each editor who is a member of a Shared Non-linear Editing Project to get his/her own User Folder within that Shared Avid® Project; and, 3) When an editor opens the Shared Project, he/she sees his/her own User Folder at the top level of the "Shared Project" structure. There is provided another folder called "Other Editors" inside which are found the User Folders of all other editors who are members of the Shared Project. The "symbolic link" structure makes it possible for each editor to have a customized view of the Shared Project, in which their own User Folder is at the top level, and all other editors' folders are at a lower level that can be collapsed into one "Other Editors" folder.

For editors who use Avid® non-linear video editing applications, the Project data created by most Avid® non-linear video editing applications is not stored in single monolithic files, as it is with many other popular non-linear editing applications like Apple's Final Cut Pro, Avid® Projects by design are typically broken up into many discrete elements that at the operating system level are really just filesystem folders and files. Thus, in Avid® Projects, it is possible to manipulate these discrete elements individually. For example, it is possible to set write permissions differently on one folder or file versus others. By the symbolic link technique of the present invention, it is possible to create different "virtual views" of an Avid® Project, such that each user has an optimized view of the Project and each user can maintain his/her own separate files for the same function (i.e., for settings).

Advantageously, the present invention may be implemented for other non-linear video editing applications, and operates to enable multiple editors to collaborate and share in video editing projects either with or without implementation of the virtualization feature.

BRIEF DESCRIPTION OF THE DRAWINGS

The objects, features and advantages of the present invention will become apparent to one skilled in the art, in view of the following detailed description taken in combination with the attached drawings, in which:

FIG. 3 also specifically depicts a novel GUI 302 which functionality is initiated for enabling an administrator to add users to the system, specifying passwords, changing passwords, and removing users from the system;

FIGS. 26A and 26B depict how the Shared Avid® Projects system of the present invention provides editors with the ability to transfer control of a Bin from one User to another;

DETAILED DESCRIPTION OF THE PREFERRED EMBODIMENTS

Figure 1:
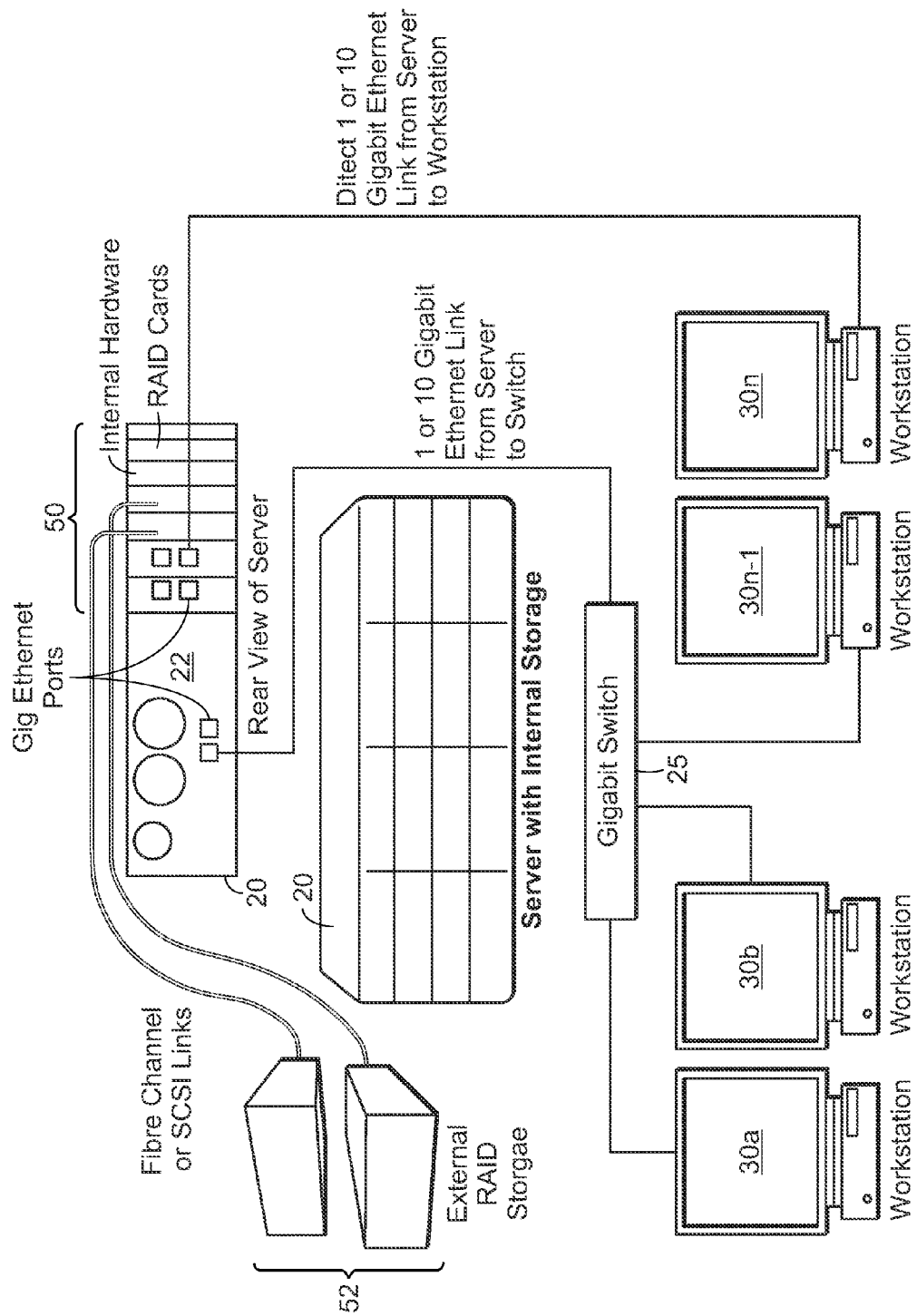
FIG. 1 depicts a base architecture and exemplary computer environment for implementing the server-side file virtualization feature according to the invention.
Figure 2:
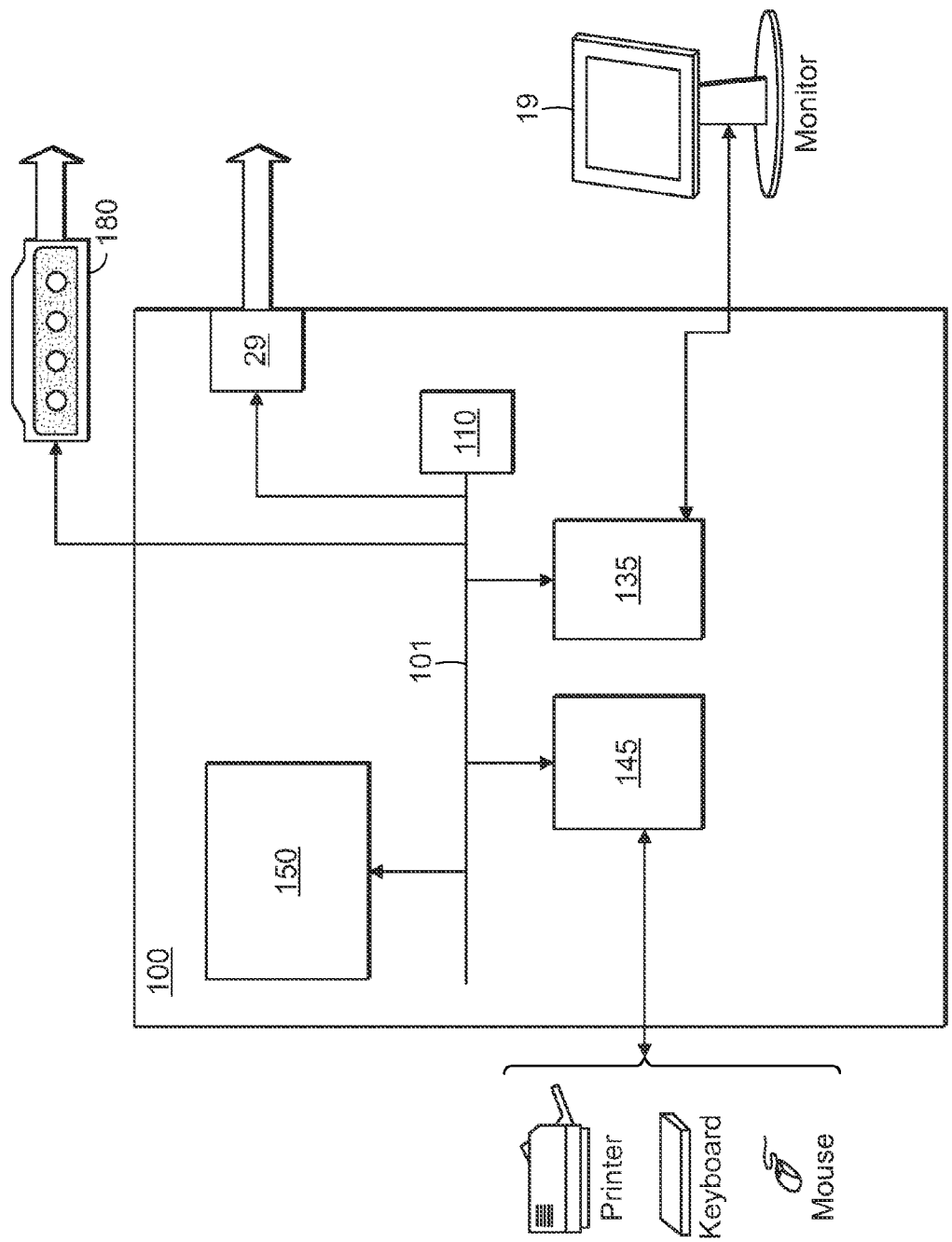
FIG. 2 depicts the configuration of a typical non-linear video editing (NLE) system workstation in communication with the server device of FIG. 1.

Referring now to drawings, and particularly to FIGS. 1 and 2, there is shown the overall computing environment in which the present invention may be implemented. As will be described in greater detail herein, the file virtualization feature enables a server device 20 to permit multiple NLE workstations to see and access the same media files (video, audio, graphics, etc.) stored in a central storage media while essentially keeping each workstation isolated from the others (i.e., unaware that the others exist).

As shown in FIG. 1, the overall computing environment in which the present invention may be implemented includes a server device 20 connecting multiple video-editing client workstations 30a, 30b, ..., 30n via a high speed network connection (e.g., Gigabit Ethernet or 10 Gigabit Ethernet). The media data can flow between the server 20 and the workstations via a switch device 25, through a direct Ethernet connection or other connection between server and workstation, or through a wireless connection. The server device 20 preferably includes one or more processor devices, e.g., an Intel Pentium4 or Xeon or an AMD Opteron, supporting processor speeds in excess of 2.4 GHz in the case of the Pentium4 and Xeon, 1.8 Ghz in the case of the Opteron. Furthermore, the server device 20 preferably includes 1 Gigabyte or more of RAM. In addition, the server 20 includes at least one high speed Ethernet port (preferably 1 Gigabit or higher). The server 20 also includes a means for storing digital media files and other data and preferably providing Terabytes of storage capacity, for example, a data storage subsystem 50 consisting of hardware RAID cards which are attached both to 32-bit PCI or 64-bit PCI/PCI-X/PCI-Express slots on the motherboard and to high-capacity internal hard drives (e.g., Serial ATA drives), and/or a data storage subsystem 52 consisting of external RAID arrays which are connected to Fibre Channel or SCSI Adapters which are also attached to 32-bit PCI or 64 bit PCI/PCI-X or PCI-Express slots on the server motherboard. More particularly, the data storage subsystem 50 may comprise storage media including, but not limited to, magnetic hard disk, optical storage drives, and even solid state disk and memory cards, etc. As would be known to skilled artisans, the hardware architecture may alternately comprise media access control devices configured to support IDE, SCSI, Fibre Channel, Firewire, and USB devices, protocols and topologies. Regardless of the storage media controller contemplated (e.g., SATA, IDE, or SCSI) it will control multiple storage media drives 52 configured in and/or connected to the server.

For purposes of discussion, in one embodiment, the centralized shared storage systems for collaborative non-linear editing and manipulation of digital video and audio files is configured, with two 3ware (a unit of AMCC, San Diego, Calif.) 9000S-8 Hardware RAID cards each attached to eight 250 GB SATA hard drives. The server and its storage subsystem are connected to an Ethernet network. The switch device 25 enabling communications with each workstation 30a, 30b, ..., 30n may comprise a Gigabit Workgroup Switch such as provided by SMC Networks® (Irvine, Calif.), enabling workstations to function at full Gigabit speeds with a Gigabit Ethernet adapter 29 having integrated Gigabit Ethernet MAC and PHY layer functions.

The server 20 with its storage subsystem 50, 52 and connections to an Ethernet network, preferably, run the Linux operating system (or, equivalently running a Unix or like Unix variant operating system—including Apple's OS X—which can run the software and hardware as described hereinbelow). The switch device 25 enabling server communications with each workstation 30a, 30b, ..., 30n may comprise a Gigabit network switch device such as provided by SMC® (Irvine, Calif.) that supports "Gigabit over Copper" Ethernet as well as "Jumbo Frames" (defined by a packet size or Maximum Transmission Unit—MTU—of 9000). This enables workstations 30a, 30b, ..., 30n to function at full Gigabit speeds over Ethernet cables 60 that allow for maximum data throughput over the network and minimum use of CPU resources both by the server and workstations in order to support network transactions. It is assumed that the server device 20 includes at least two Gigabit Ethernet network adapters 22 having integrated Gigabit Ethernet MAC and PHY layer functions. Such a system—along with the storage subsystem diagramed—allows for sufficient data transfer between the server and workstations to support at least 10 NLE workstations or other capable hardware such as, but not limited to, encoders, playout servers, and video recorders that play from and record to devices such as hard drives simultaneously accessing media files on the storage subsystem.

As shown in FIG. 2, with respect to the workstations 30a, 30b, ..., 30n which would be connected to the centralized shared storage systems for collaborative non-linear editing and manipulation of digital video and audio files, each comprises a computer system 100, including one or more processors or processing units 110, a system memory 150, and a bus 101 that connects various system components together. For instance, the bus 101 connects the processor 110 to the system memory 150. The bus 101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 100 includes one or more monitors 19 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 100 additionally includes: computer readable media, including a variety of types of volatile and non-volatile media, each of which can be removable or non-removable. For example, system memory 150 includes computer readable media in the form of volatile memory, such as random access memory (RAM), and non-volatile memory, such as read only memory (ROM). The ROM may include an input/output system (BIOS) that contains the basic routines that help to transfer information between elements within computer device 100, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 101 by one or more data media interfaces (not shown). Alternatively, the hard disk drive, magnetic disk drive, and optical disk drive can be connected to the system bus 101 by a SCSI interface (not shown), or other coupling mechanism. Although not shown, the computer 100 can include other types of computer readable media. Generally, the above-identified computer readable media provide non-volatile storage of computer readable instructions, data structures, program modules, and other data for use by computer 100. For instance, the readable media can store an operating system (O/S), one or more application programs, such as video editing client software applications, and/or other program modules and program data for enabling video editing operations via Graphical User Interface (GUI).

Input/output interfaces 145 are provided that couple the input devices to the processing unit 110. More generally, input devices can be coupled to the computer 100 through any kind of interface and bus structures, such as a parallel port, serial port, universal serial bus (USB) port, etc. The computer environment 100 also includes the display device 19 and a video adapter card 135 that couples the display device 19 to the bus 101. In addition to the display device 19, the computer environment 100 can include other output peripheral devices, such as speakers (not shown), a printer, etc. I/O interfaces 145 are used to couple these other output devices to the computer 100.

As mentioned, computer system 100 is adapted to operate in a networked environment using logical connections to one or more computers, such as the server device 20 that may include all of the features discussed above with respect to computer device 100, or some subset thereof. It is understood that any type of network can be used to couple the computer system 100 with server device 20, such as a local area network (LAN), or a wide area network (WAN) 99a (such as the Internet). When implemented in a LAN networking environment, the computer 100 connects to local network 99a via a network interface or adapter 29 that support the above-mentioned Gigabit over Copper Ethernet as well as Jumbo Frames. When implemented in a WAN networking environment, the computer 100 connects to the WAN 300 via a high speed cable/dsl modem 180 or some other connection means. The cable/dsl modem 180 can be located internal or external to computer 100, and can be connected to the bus 101 via the I/O interfaces 145 or other appropriate coupling mechanism. Although not illustrated, the computing environment 100 can provide wireless communication functionality for connecting computer 100 with remote computing device, e.g., an application server 20 (e.g., via modulated radio signals, modulated infrared signals, etc.).

In the networked environment, it is understood that the computer system 100 can draw from program modules stored in a remote memory storage devices (not shown) in a distributed configuration. However, wherever physically stored, one or more of the application programs executing the non-linear video editing system of the invention can include various modules for performing principal tasks. For instance, the application program can provide logic enabling input of video source data for storage as media files in the centralized data storage system and/or performing the video editing techniques thereon. Other program modules can be used to implement additional functionality not specifically identified here.

It should be understood that other kinds of computer and network architectures are contemplated. For example, although not shown, the computer system 100 can include hand-held or laptop devices, set top boxes, programmable consumer electronics, playout servers, video encoders, video recorders that play from and record to devices such as hard drives, mainframe computers, etc. However, it is understood that the computing environment 100 can employ a distributed processing configuration. In a distributed computing environment, computing resources can be physically dispersed.

With respect to the file virtualization system of the invention, for every media file stored on the server device—either on the storage subsystem device described herein, or on any other storage device that can be attached to the server (for instance, an array of SCSI drives or a Storage Area Network device that can be linked to the sever through SCSI or Fiber Channel connections)—there is a corresponding symbolic link to that file for each workstation, device, or user that is given access to the server (or to that particular Project Workspace on the server).

In part, the software component of this invention automates the process of creating symbolic links to the actual media files and placing those links in appropriate folders that will only be accessed by one single user or workstation. While each user or workstation, device, or user will see links to files rather than the files themselves, the NLE applications and devices treat the links as if they are the actual files; thus, the NLE applications and devices never have to "see" anything on the server that's outside their own unique folders.

In the case of Avid® Technology's Xpress® DV, Xpress® Pro, Adrenaline™ and Newscutter® NLE applications (Avid Technology, Inc. Tewksbury, Mass. 01876), for example, when a given workstation running these applications generates database files based on the media file "links" it sees in its own folder, the database files will get stored alongside all the links—inside the individual user's or workstation's folder—and thus the database files will only be visible to one user or workstation and can not corrupt the database files of other users or workstations. In other words, each user or workstation will make its own database files and store them inside its own folder—which will never be seen by any other user or, workstation.

As for the problem of capturing new media with Xpress® DV and Xpress® Pro onto shared storage, any temporary audio and video files will get stored in a "Creating" folder that resides inside the user's or workstation's own User Directory. When the capturing process is completed, the NLE application will move the files out of the "Creating" folder and into the user's or workstation's main User Directory. At this point, the new media files will only be accessible to that one user or workstation (and the corresponding media database file generated by the Avid® application in the User Directory will only index that user's current files). But the software component of the invention implements functionality for automating the movement of the new actual media files out of the workstation's folder and into the shared folder, and, automatically creating in the user's or workstation's User Folder symbolic links back to those shared files. When other users are ready to have access to the new media, they too can use the software to refresh their own folders. In that way, each workstation will only become "aware" of new media at a time when it is convenient to the user of that workstation (i.e., when the NLE application isn't running, or when the NLE application isn't engaged in some activity that might get interrupted if the application were to become aware of new media files).

In the case using two different brands of NLE systems simultaneously (i.e., Premiere and Final Cut Pro), the technique of virtualizing files not only keeps each workstation's storage space separated from the others (yet linked), but it also allows for the naming of virtual files so that they are seen by each application as the right type of media file. For example, the NLE application Final Cut Pro works natively with Quicklime files that it saves without a *.mov extension. While the Premiere NLE application can also work with Quicktime files, it can not recognize them if they do not have this *.mov extension. However, when media files created in Final Cut Pro are virtualized through symbolic links so that they're accessible to Premiere, the link files can be renamed such that they have the required *.mov extension. Thus, for example, as outlined in a section below ("annotated schematic of a RAID directory") that illustrates a typical directory and file structure that might be found on the centralized storage volume, if a user captures a 20 minute clip in Final Cut Pro, the clip will actually be split into 3 clips—two that take up about 2 GB of space and one that takes up about 200 MB. Those clips will be titled "Clip-av", "Clip-av-1, "Clip-av-2". Clip-av will actually contain references to the other two clips—and thus, to bring the entire 20-minute clip into Premiere, the first clip "Clip-av" must be renamed "Clip-av.mov", but the other two clips must retain their original names. The software of the present invention takes care of all the renaming and only renames the correct clips.

In effect, the technique of using symbolic links to virtualize media files solves numerous different problems in getting multiple NLEs to access a common group of files that reside on a Linux (or other Unix-based) server.

In accordance with another aspect of the present invention, as now described herein with respect to FIGS. 3-9, the executable program on server 20 providing the file virtualization feature of the invention additionally provides a novel Graphical User Interface (GUI) for initiating functionality for managing the centralized storage system 50. For instance, in a further embodiment of the invention, the software may be used to add a Project Workspace to the system. For instance, the software implements functionality for generating a display interface 200 such as shown in the example GUI 200 of FIG. 3, that provides a series of tabs providing an interface for enabling the following media management functions that include, but are not limited to: adding a user to the system via tab 202; creating a Project Workspace to the system and designating a specific RAID array on which to put it via tab 205; adding users to a Project Workspace via tab 208; determining Project Workspace usage status via tab 211; specifying allocation of disk storage space for a project or Project Workspace via tab 213; sharing media files via a tab 215; refreshing media files via tab 218; deleting media files via a tab 222; extending the physical space available for a Project Workspace by expanding the Project Workspace onto an additional RAID array via tab 213. Moreover, this aspect of the invention will enable an administrator to chose what type of NLE system will be the main type to work on the project, i.e., configure the system to configure the proper sub-directories.

Figure 3:
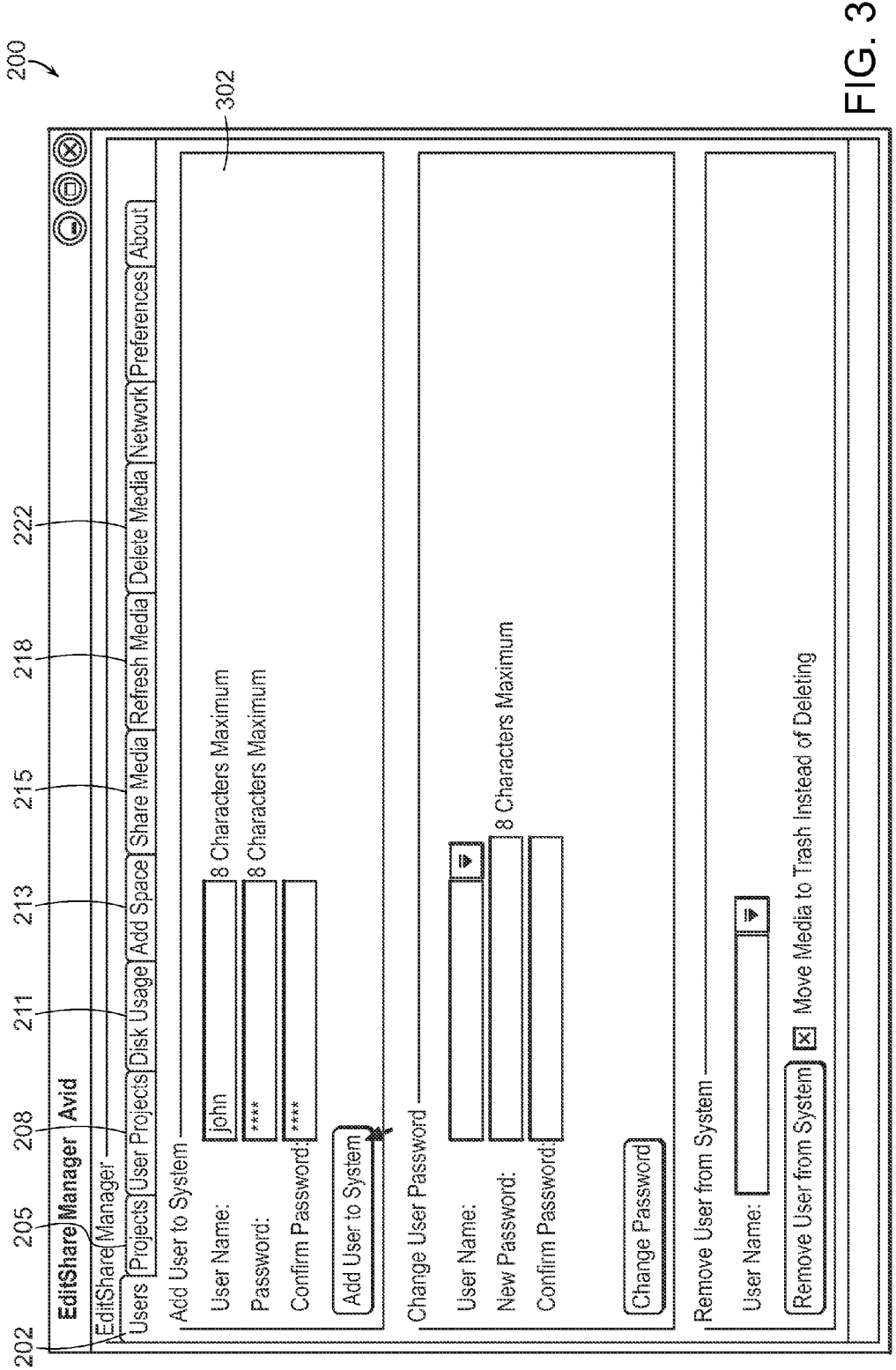
FIG. 3 in general depicts a novel GUI 200 via which functionality is initiated for enabling management of the centralized shared storage systems for collaborative non-linear editing and manipulation of digital video and audio files according to a further aspect of the invention.

Specifically, selection of the tab 202 enables an interface 302 such as shown in FIG. 3 enabling the addition of users to the system. In order for one or more independent users to store media on the system, and then access their own media as well as access media that has been stored by others, it is first desirable to add those users to the system so that they have a username and password on the server and so that the server can authorize them to access any and all resources that the specific user is authorized to access. This is accomplished by an administrator who can enter the user's name as well as the user's password in the respective entry fields shown in the GUI 302. In the same operation, this feature adds the same username and password to the authorized Samba (or Windows networking) users list It is further understood that, via the GUI 302 shown in FIG. 3, functionality is provided that enables a user to be removed from the system. This feature, while preferably only accessible to an administrator, removes a username and password from the Linux (or Unix) system. In the same operation, this feature removes the same username and password from the an authorized Samba (Windows networking) users list. Thus, via the GUI display 302 illustrated in FIG. 3, there is caused for display a dropdown list of existing users that may be selected, for example, by highlighting, and, provides a clickable button that when selected removes the user from the system. When the button is clicked, the username and password is also removed from the Linux (Unix) OS, and further, removes the user and password from the Samba users list (not shown). Moreover, this feature implements functionality for deleting all directories or folders associated with that user.

Figure 4:
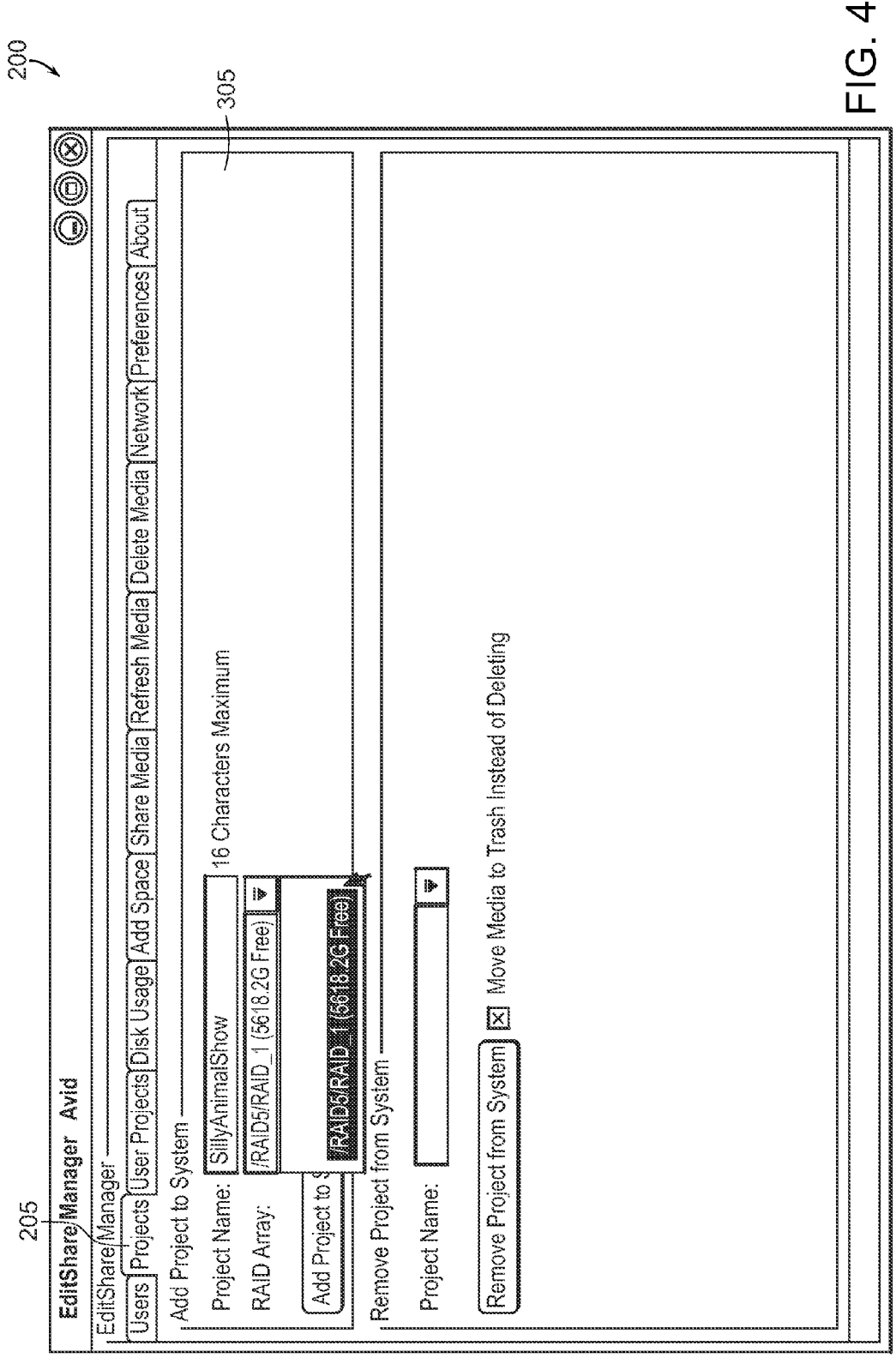
FIG. 4 depicts a novel GUI 305 via which functionality is initiated for enabling an administrator to define various logical Project Workspaces where digital media files can be stored according to a further aspect of the invention.

Referring back to FIG. 3, selection of the tab 205 generates an interface 305 such as shown in FIG. 4, enabling an administrator to specify RAID array where different Project Workspaces can be defined. These are upper-level directories into which organizations of one or more independent users can place digital media files and other data files which are in some way related to one another. While, creating multiple Project Workspaces is not strictly necessary in order to implement the present invention, creating multiple Project Workspaces makes it easier to manage media files when groups of files are no longer wanted. For instance, the entire Project Workspace can be deleted—thus deleting all of the files contained within—while leaving untouched all media files in other Project Workspaces. Additionally, by providing the means to create multiple Project Workspaces, the system enables an administrator to designate that one Project Workspace may be accessed only by a particular group of users while other Project Workspaces may be accessed only by other particular groups of users. Thus, via the GUI 305, as illustrated in FIG. 4, an administrator is not only able to create distinct Project Workspaces, but they are also able to designate on which storage volume or RAID array the Project Workspace will be created. Thus, via GUI 305, a user may enter a Project Workspace name, designate a RAID array, and click on "Add Project to System" which triggers the software program to create a directory with the name of the Project Workspace within the chosen RAID array or Storage Volume.

In accordance with this aspect of the invention shown with respect to FIG. 4, and with reference to the example annotated schematic of a RAID directory listing provided hereinbelow, the display interface 305 presented to the administrator enables entry of the name of the new Project Workspace (e.g., "SomeProject") in entry field; and, causes for display via a "RAID Array" drop down box a list of all RAID arrays connected to the system, in addition to indicating how much space is available on each array, and, in addition, permit the administrator to choose a RAID array. Additional functionality enabled via the interface 305 of FIG. 4, is the ability for a administrator to create a directory on the array called, for example, "SomeProject_1", and create a subdirectory within "SomeProject_1" called, for example, "OMFI MediaFiles".

Figure 5:
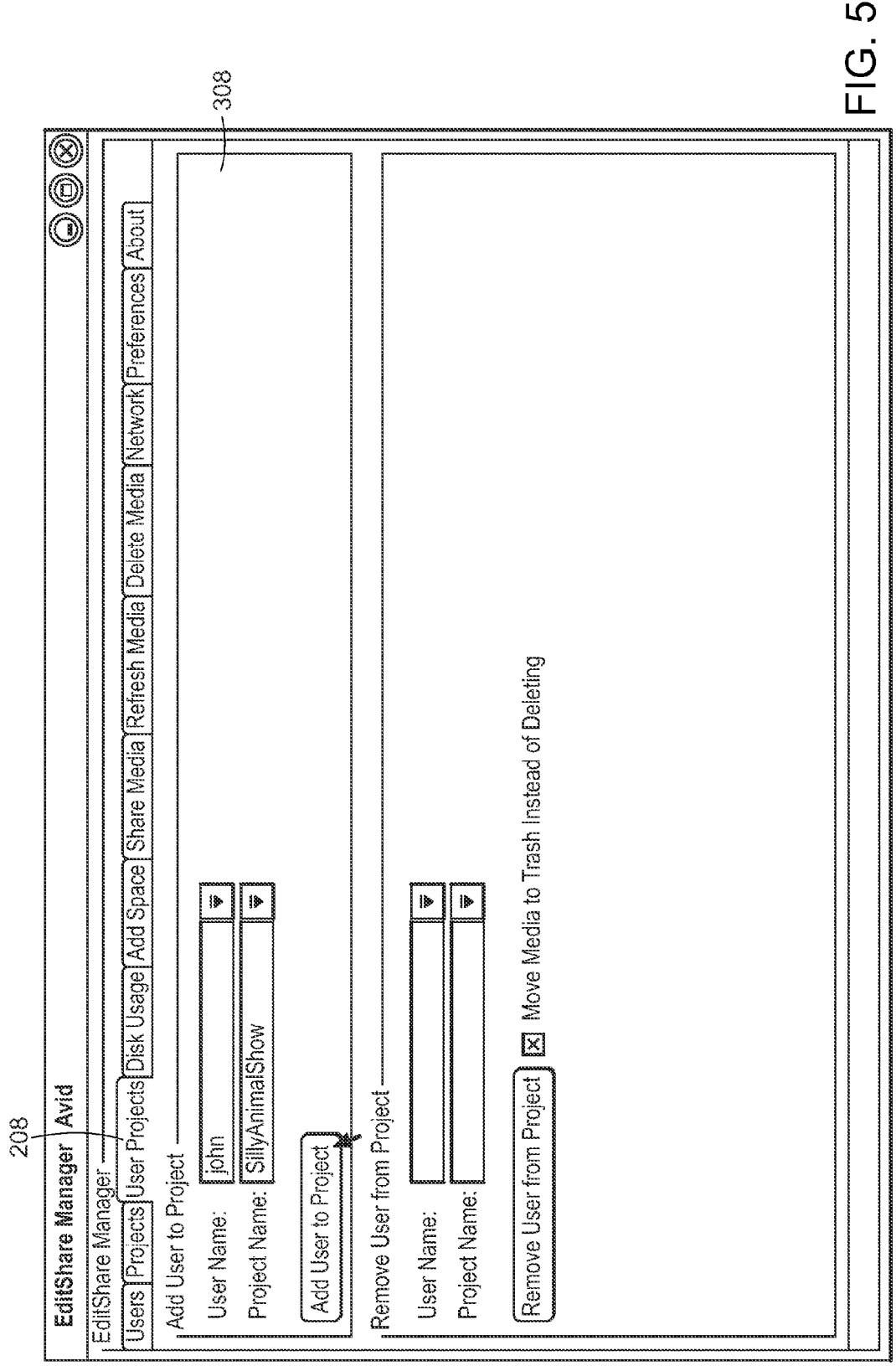
FIG. 5 depicts the novel GUI 308 via which functionality is initiated for enabling an administrator to specify which particular users may have access to the Project Workspaces created via the interface of FIG. 4.

Referring back to FIG. 3, selection of the tab 208 generates an interface 308 now such as shown in FIG. 5 enabling the addition of users to the Project Workspaces. Adding users to a Project Workspace triggers several actions by underlying the computer program. For instance, inside the Project Workspace directory, the computer program creates a User Directory which specifically corresponds with both the User's name and the Project Workspace name. The computer program further creates a Windows (Samba) Network Share (and in some cases also a Macintosh AFP Share) that corresponds to the User and the Project Workspace, such that when the User logs on to the server with his/her Username and Password, the Network share will be visible in a list of accessible network resources—thus giving each user an opportunity to mount each of his/her Network Shares (the number of shares depending on the number of Project Workspaces of which he/she is a member) and use them as if they were hard drives attached to the local client machine. In one example embodiment of the invention, the Network Shares are configured in such a way that a particular user's Network Shares are only visible to a user who is logged on the server as that user. Thus, users are not distracted by seeing the Share names of other users—Shares that are only authorized to be accessed by the user who corresponds to the Share.

Thus, in accordance with this another aspect of the present invention, the software of the present invention provides, via the Graphical User Interface, the ability to add the user to a currently existing Project Workspace. Thus, as shown in FIG.

5, an administrator may select the name of the from the User Name drop down box; and, select a "Project Name" from a drop down box that provides a list of all Project Workspaces that are selectable, for example, by highlighting a Project Workspace; and, provides a button to initiate the action to add the new user to the Project Workspace. Although not shown, in a further implementation of the software, this feature will additionally enable the administrator to select the type of NLE system that will be used and then, inside the main Parent Project folder, set up the proper directories for that user and the type of NLE he/she will be using.

More particularly, with reference to the example annotated schematic of a RAID directory listing provided hereinbelow, the software will perform functionality that scans the Linux (or Unix) OS for all usernames that are part of the group called "editors"; causes for display the above usernames via "User Name" drop down box and allows the administrator to select one; scans all media storage devices (e.g., RAID arrays) RAID arrays attached to the server and looks for any directories with names in the format "ProjectName_SomePositiveInteger" (e.g., ProjectName_1), then displays those names (without the integers) in the Project Name drop down box, allowing an administrator to choose a Project. When the administrator clicks on the "Add New User" button, functionality is performed to automatically create Child subdirectories (b) within all the Parent directories that have the form "ProjectName_SomePositiveInteger" (a) called "Username_ProjectName_SomePositiveInteger", and within the latter Child directories (b), automatically create subdirectories (c) called "OMFI MediaFiles" in the case of Avid® editing applications or "Capture Scratch" in the case of Final Cut Pro. It is understood that there could be more than one RAID with a Parent Directory belonging to the Project Workspace—for example, if Project Workspace files were stored on more than one RAID array. Thus, the software will add the user to all Arrays where the Project Workspace is physically represented. Furthermore, the Samba configuration file will be additionally modified to add the Child subdirectories (b) as Samba shares that will appear on the network as mapable network drives on Windows systems. Finally, the invention provides software functionality that modifies the Netatalk (Apple Fileshare Protocol) configuration file to make any added Child subdirectories (b) appear as mountable network drives on Macintosh systems.

It is understood that, via the GUI 308 shown in FIG. 5, functionality is provided that enables a user to be removed from a Project Workspace. This feature, while preferably only accessible to an administrator, removes a user from a Project Workspace. All files and links in that user's directory for that Project will be deleted from the system. Particularly, to achieve these ends, with reference to the example directory listing provided hereinbelow, the invention implements functionality for scanning the Linux (or Unix) OS for all usernames that are part of the group called "editors"; causes for display the above usernames and allows the administrator to select one; causes the scanning of all RAID arrays attached to the server and looks for any directories with names in the format "ProjectName_SomePositiveInteger" (i.e., ProjectName_1), then displays those names (without the integers) in the Project Name drop down box, thus allowing the administrator to choose a Project; and finally, deletes all User Directories associated with that user for that Project Workspace. Before this last action occurs, the administrator will have to confirm the action at least two times.

Figure 6:
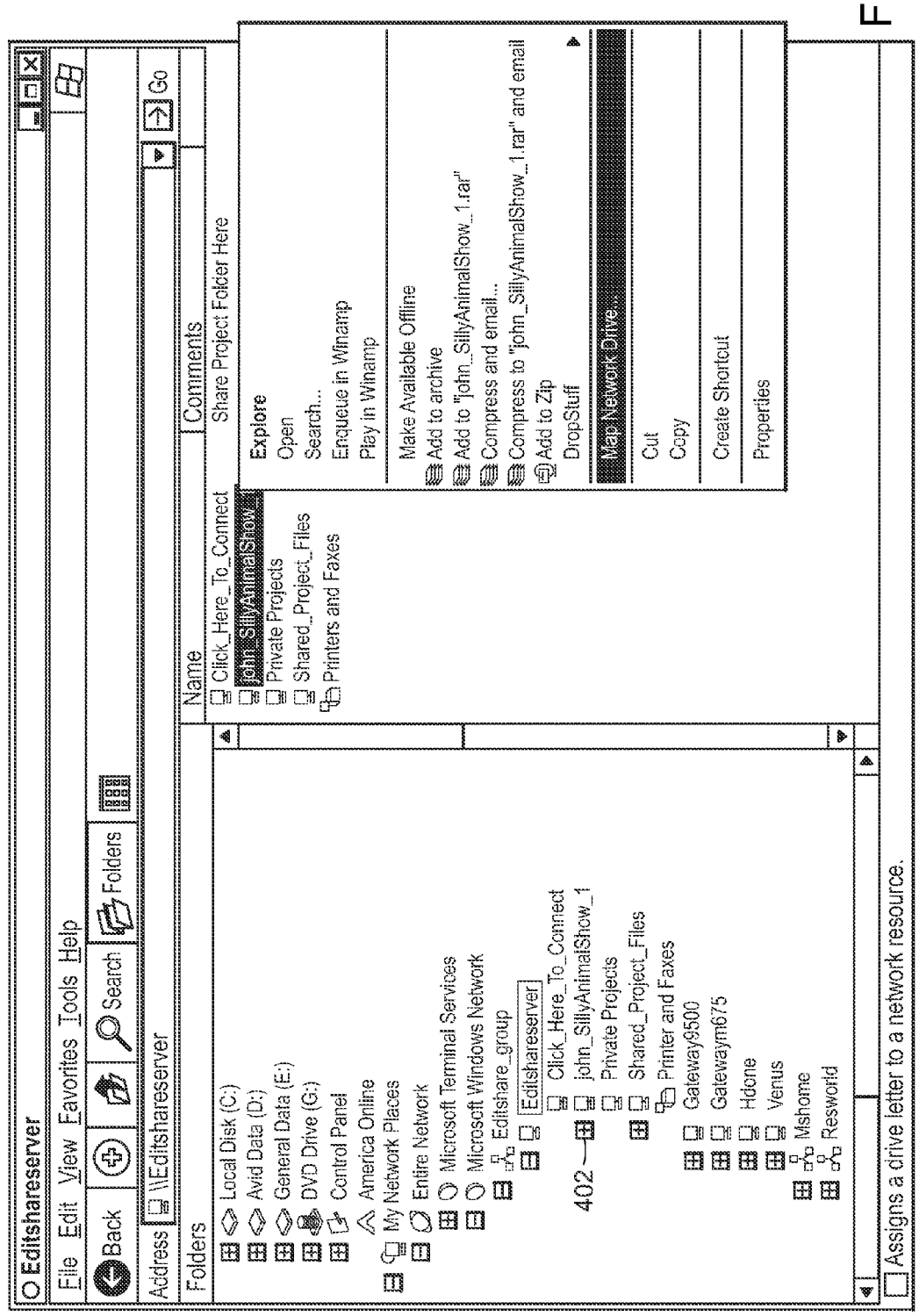
FIG. 6 depicts an example of the User Directory that gets created when a user is given access to a Project Workspace, and shows how that User Directory is visible on a network only to that user particular user who has access to the Project Workspace.

It is understood that, when a user connects to the server as him/herself and maps or mounts one or more that user's User Directories, the user is then free to store media files (or any other data files) into any of that user's User Directories that resides inside any of the Project Workspaces of which he/she is a member. Typically, a user will capture audio and video files from a videotape and store the resulting digital media files inside his User Directory. A user may also transfer media files from another source, i.e., a hard drive or CD, into the User Directory. A user may also render media files into his/her own User Directory, etc. At this point, only that one user is able to access and manipulate the media files that have been stored inside the User Directory, because no other user is able to access the files that are inside another user's User Directories, FIG. 6 shows an example Windows interface 400 of a NLE wherein a User Directory 402 has been created for a user John in a Project Workspace.

Figure 7:
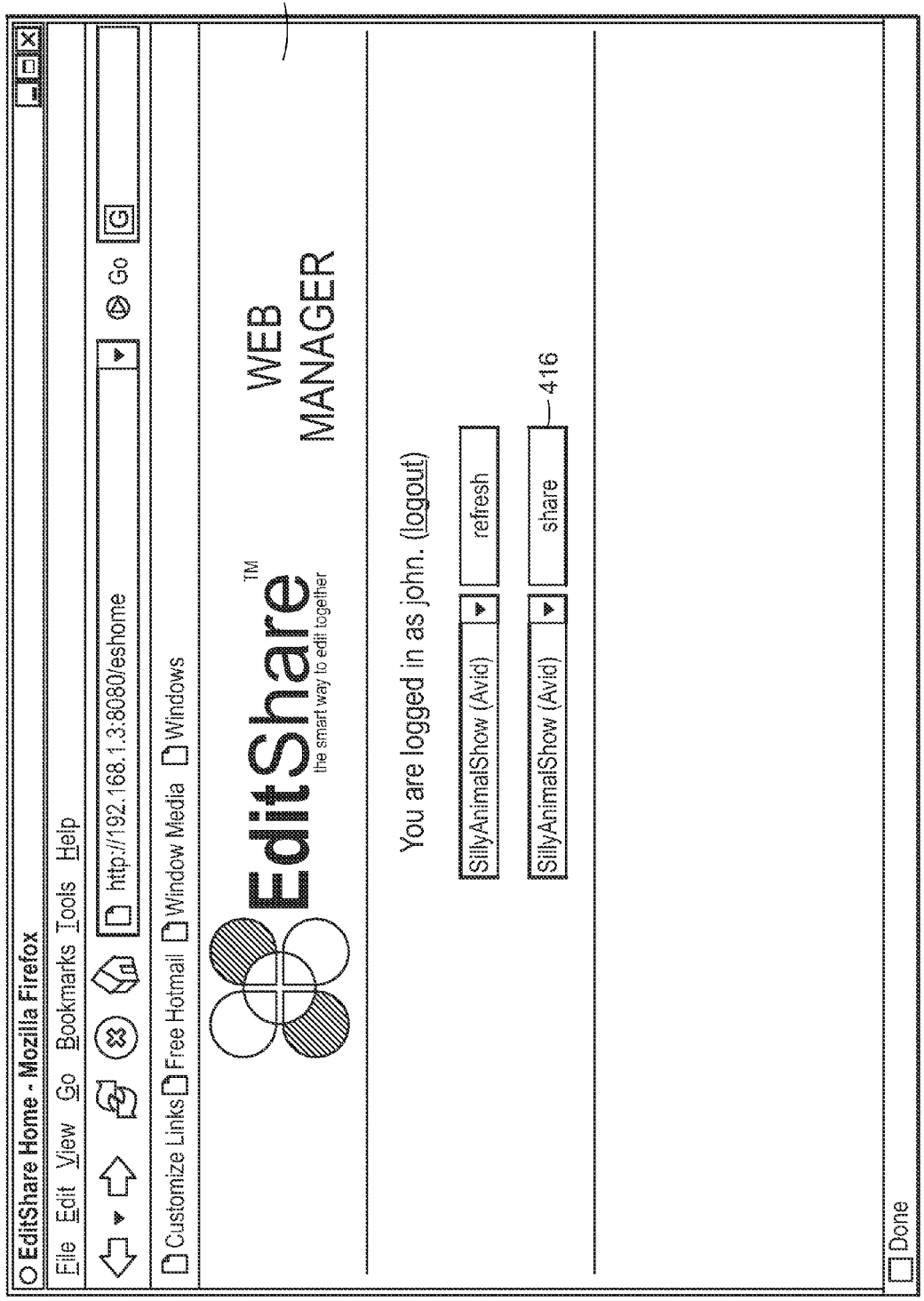
FIG. 7 depicts a novel web page interface 415 that enables a user to share media in the centralized shared storage system according to the invention.
Figure 8:
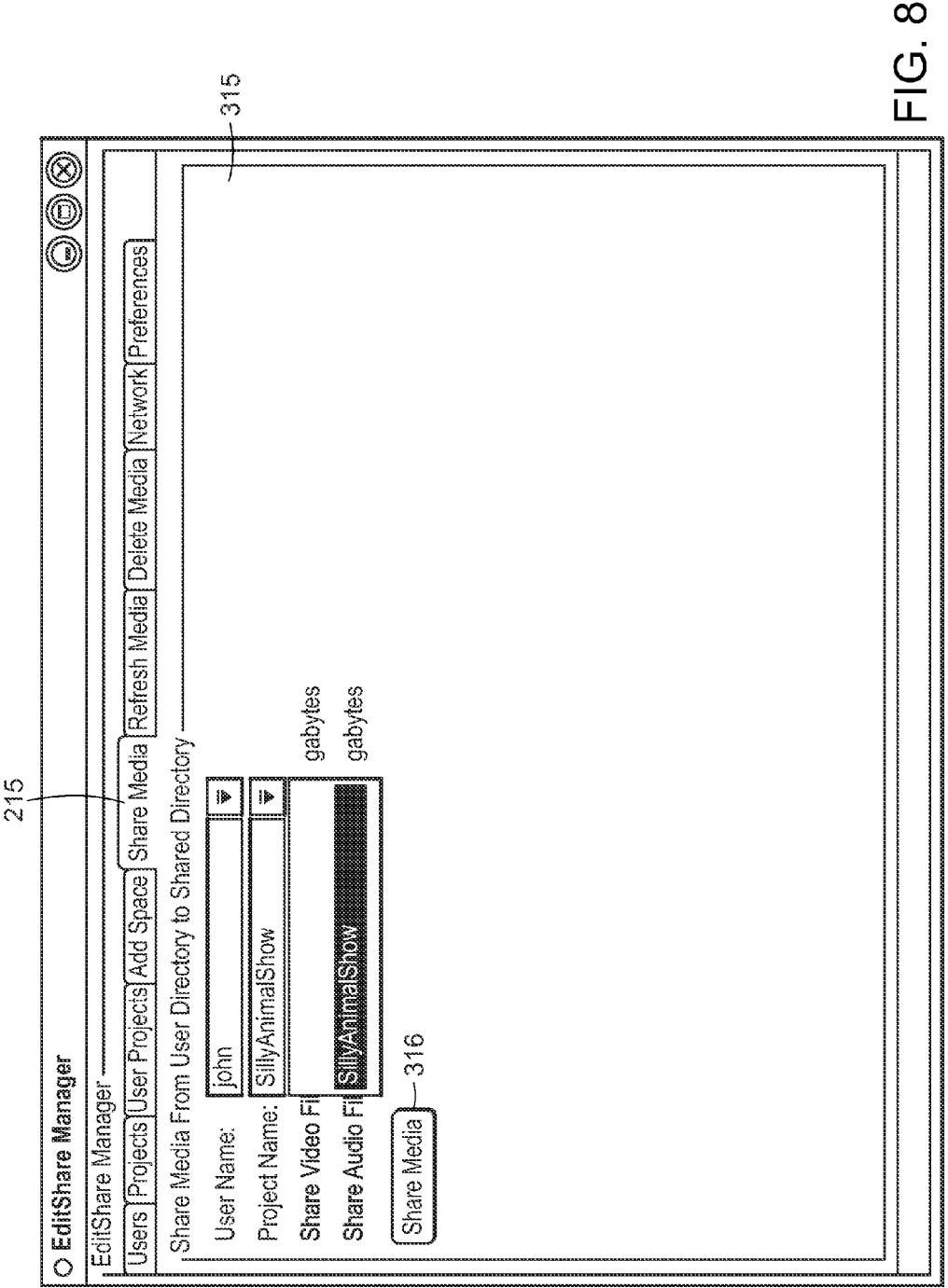
FIG. 8 depicts a novel GUI 315 that enables an administrator to share the media files of one or more users who are members of a specific Project Workspace in the centralized shared storage system according to the invention.
Figure 9:
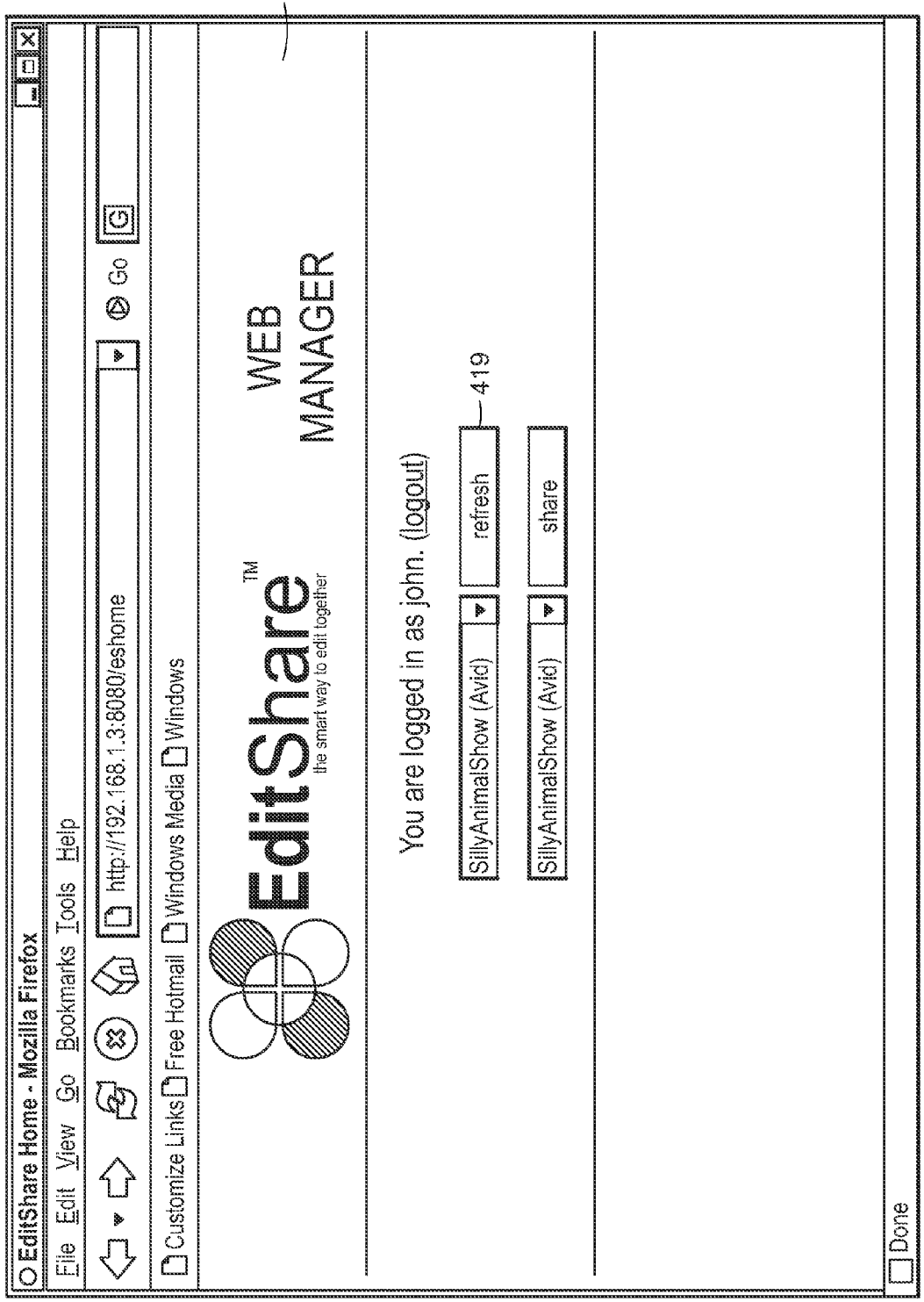
FIG. 9 depicts a novel web page interface 418 that enables a user to refresh media in the centralized shared storage system according to the invention.

Referring back to FIG. 3, selection of the tab 215 generates an interface 315 such as shown in FIG. 8 providing means for an administrator to share media files from a specific user's User Directory that associated with a specific Project Workspace. Thus, in order for users to access the files that have been stored (captured, rendered, transferred, etc.) by another user, it is necessary for those files to be explicitly shared. The files can be shared by both the user who stored them and by a person who has the administrator password and who therefore is capable of running the administrator GUI. To share files, a user; 1) first connects to the user's GUI via an example Web Interface 415 shown in FIG. 7; 2) and via the web interface 415 selects the Project Workspace name where he/she has stored files he/she wants to share; and 3) clicks on the Share button 416. Similarly, an administrator can share files via the interface 315 such as shown in FIG. 8 by clicking on the Share tab of the Administrator GUI; selecting the username of the person who has stored media files to share; selecting the Project Workspace name where the files are located and clicking on the Share Media button 316. In both cases, clicking on the Share button triggers the underlying software to act on all of the actual media files that are stored within the User Directory and move those files out of the User Directory and into a higher level Shared Media Folder. The software then creates a link for each of the files that were moved (in the example below, a symbolic link) and places that link in the User Directory. Thus, the user can still access the media files he/she stored in the User Directory, but now the files will only be accessed indirectly via the links. From the point of view of NLE software, media encoders, and other software and hardware that is commonly used for manipulating digital media files, it is possible to perform all normal activities with the media files as if the files were under the exclusive control of the user or client computer. However, the actual media files are effectively made "read only" and protected from accidental or unauthorized erasure.

In a specific example scenario implementing Avid® NLE software, because each Avid® client only sees its own folder, and that folder is populated with a unique set of links to the actual media (plus any actual media that has not yet been shared), each client is able to create its own unique media database files which index the media files in a particular Project Workspace, and store those database files where they would normally be stored—alongside the media files (or in this case, alongside links plus unshared actual media files).

The sharing of media files according to this aspect of the invention is enabled by the software that provides, via the Graphical User Interface, the ability to move media. Thus, as shown in FIG. 7, a user may take actual media files out of a User's User Directory (i.e., after they have been captured—something that usually takes place at the beginning of a project, and then on and off throughout the project); relocate the media files, for example, in a Parent Project Directory;

and, replaces the files in the User's Project Directory with symbolic links to the files in their new location.

With reference to FIG. 8 and with reference to the example annotated schematic of a RAID directory listing provided hereinbelow, functionality is implemented at the server to scan the Linux (or Unix) OS for all usernames that are part of the group called "editors"; retrieve and display, via display interface presented to the user, the above usernames in a drop down list and, allow the user to select one; scan all RAID arrays attached to the server and look for any directories with names in the format, e.g., "ProjectName_SomePositiveInteger" (i.e., ProjectName_1); display those names (without the integers) in the Project Name drop down box; and, allow the user to choose a Project. Although not shown, further to this functionality, the system may then enable the user to select an optional threshold for moving video files and select an optional threshold for moving audio files. The default is zero, but a user may choose to only move files that are large than some value, e.g., in order to prevent small rendered files like audio and video dissolves from being moved into the central directory. Subsequently, upon user selection of the "Share Media" button 316, functionality is invoked to determine all files that are in any of the user's User Directories for the chosen Project Workspace (in the form of UserName_ProjectName_SomePositiveInteger" on each RAID array); and, for each file that is not a symbolic link and that is also a media file (i.e., not a database file), and, that is larger than the threshold set, the software moves that file out of the user's User Directory, places it in the Shared Directory for the chosen Project Workspace (essentially a cut and paste operation), and replaces the file in the user's User Directory with a symbolic link. This same sequence of events is repeated or each RAID array where files or the Project exist. Because all file movement remains within a given RAID, the actions are virtually instantaneous.

Figure 10:
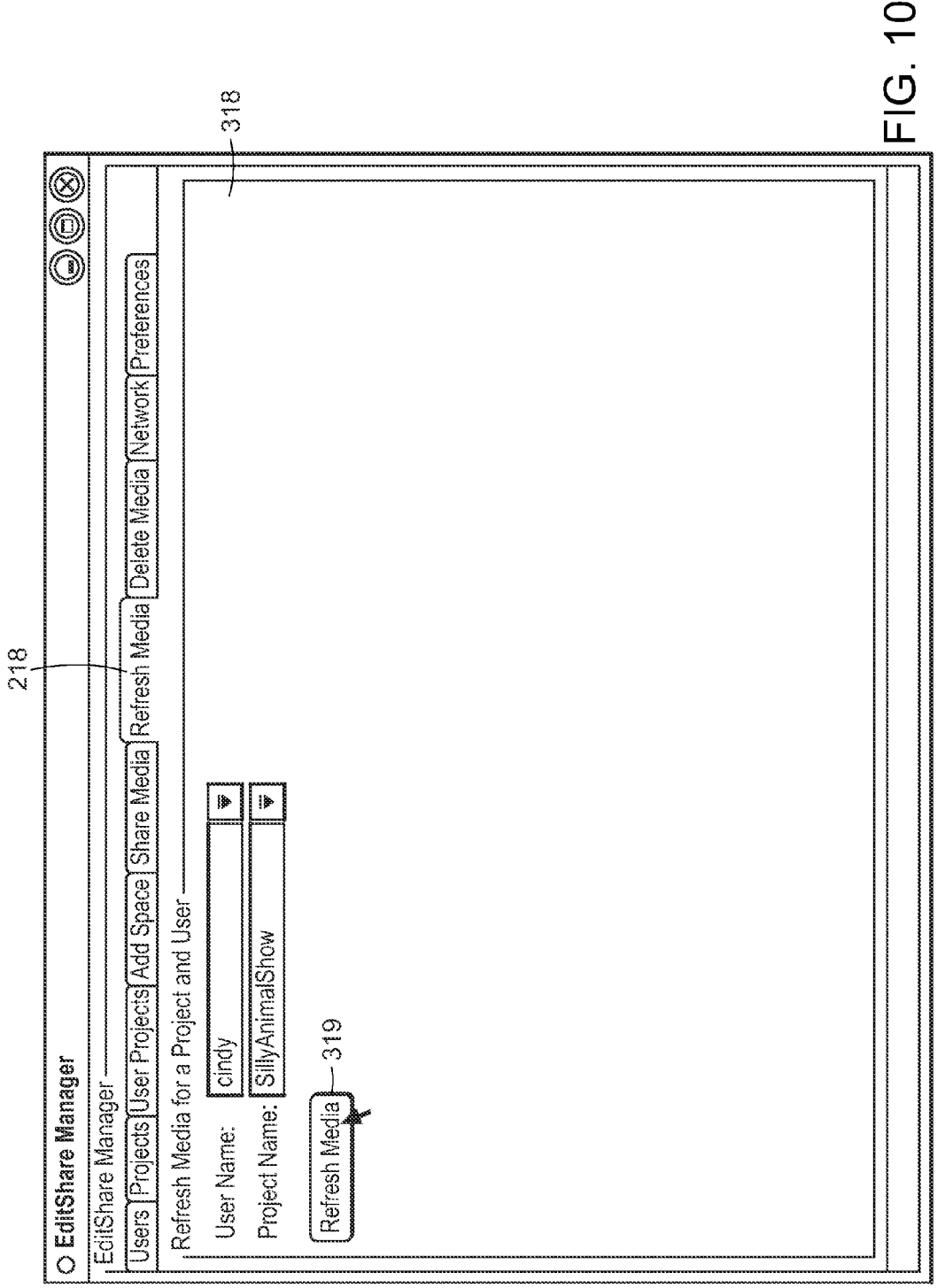
FIG. 10 depicts a novel GUI 318 that enables an administrator to refresh media for one or more users who are members of a specific Project Workspace in the centralized shared storage system according to the invention.

Referring back to FIG. 3, selection of the tab 218 generates an interface 318 such as shown in FIG. 10 providing the ability to Refresh (synchronize) media. For example, in a collaborative production environment, users will often want to access and manipulate files that were created and stored by other users. As explained above, once such files have been Shared—either by the user or by the administrator—the actual files now reside in a Shared Media folder outside the originating user's User Directory and thus the actual files are now in a place where other users can get access to them. To obtain access to another user's media files, it is necessary that the non-originating user (the one who wants to see the shared files) have his User Directory refreshed, something that he himself can set in motion or that can be done by any person who has the administrator password and who therefore is capable of running the administrator GUI (e.g., FIG. 3). To run the Refresh function, a user: 1) connects to the user's GUI via an example Web Interface 418 shown in FIG. 9; 2) selects the Workspace Name where there a shared files that he/she wants to access; and 3) clicks on the Refresh button 419. Similarly, an administrator can Refresh User Directories via the interface 318 such as shown in FIG. 10 by: clicking on the Refresh tab 218 of the Administrator GUI; selecting the username of the person who needs to access shared media files; selecting the Workspace Name where the files are located; and, clicking on the Refresh button 319. In both cases, clicking on Refresh Media button triggers the underlying software to compare the links that are in a User Directory to the actual media files that are located in the Shared Media folder. For any file that exists in the Shared Media Folder that doesn't have a corresponding link in the User Directory, a link is made and placed in the User Directory—thus giving that user access to the shared files. Each time a user adds new media files to his/her own User Directory, in order to let other colleagues use and manipulate the files, the User (or Administrator) must explicitly Share the files so as to move the actual files to the Shared Media Folder, and Refresh other users so that links to the files get created and placed in those other users' User Directories.

With reference to FIG. 10 and with reference to the example annotated schematic of a RAID directory listing provided hereinbelow, functionality is implemented at the server to scan the Linux (or Unix) OS to determine all usernames that are part of the group called "editors". Then, it displays the obtained usernames and allows the administrator to select one, and additionally provides the opportunity to select "all users" via a drop down list (not shown). Then, functionality is invoked to scan all of the data storage devices (e.g., RAID arrays) attached to the server and look for any directories with names in the format "ProjectName_SomePositiveInteger" (i.e., ProjectName_1) according to the example described herein. The system then displays those names (without the integers) in the Project Name drop down box (not shown), allowing a user to choose a Project. In response to detecting selection on a "Refresh" button, software considers one at a time all media files stored in the Shared Media Folder "SomeProject_FirstPositiveInteger/OMFI MediaFiles", and determines whether a symbolic link to that file exists in the selected user's User Directory "UserName_SomeProject_FirstPositiveInteger/OMFI MediaFiles/". If one doesn't already exist, a symbolic link is created in the user's User Directory. This same procedure is performed for the Project-specific files stored on each RAID array. It is additionally repeated for every user if "all users" were chosen in a drop down field. A similar functionality is implemented on the server when a user invokes the "Refresh" function 419 from the Web Interface 418 from FIG. 9—only the server already knows which user to act upon by virtue of the fact that the user must log on to the Web Interface and is only permitted to act upon his/her own User Directories and Project Workspaces. Thus, unlike in the case of the administrator, the user is not given the option to select "all users"

According to a further aspect of the invention, and with reference to the example annotated schematic of a RAID directory listing provided hereinbelow, the tool for managing the centralized storage system includes the ability to Refresh media in such a way that it can be used by a different NLE application. Via a GUI (not shown) the software initiates functionality that performs a function similar to the Refresh Media feature, however, facilitating a more extensive manipulation in the symbolic link names in order to make media files used under one NLE available in another brand of NLE. For instance, a user having audio and video media files that were created by the editing application Final Cut Pro (FCP), can make these media files accessible to the editing application Adobe Premiere. To achieve this, the software will initiate functionality to: scan the Linux (or Unix) OS to obtain all usernames that are part of the group called "editors"; display the obtained usernames and allow the user to select one; scan all media storage devices (e.g., RAID arrays) attached to the server and looks for any directories with names in the format "ProjectName_SomePositiveInteger" (i.e., ProjectName_1), for example; and display those names (without the integers) in a Project Name drop down box. The user is enabled to choose a Project from the displayed list. According to this embodiment, the user is then asked to select "from" and "to" options—i.e., from the NLE FCP application to the NLE Premiere application, for example. Alternately, the user might only select a "to" option and the software will autodetect what is the form format of the original media. This user input will indicate which algorithm to use in processing the media files. Upon detecting that a user has selected a "Refresh" button, software processes one at a time all media files stored in the Shared Media Folders "ProjectName_First-PositiveInteger/Capture Scratch" and "ProjectName_First-PositiveInteger/Premiere Media Files" and asks whether a symbolic link to that file exists in the selected user's User Directory "UserName_ProjectNameFirstPositiveInteger/Capture Scratch or UserNameProjectName_FirstPositiveInteger/Premiere Media Files". A symbolic link is created in the user's appropriate User Directory if one doesn't already exist. However, unlike in the "Refresh" feature described hereinabove with respect to FIGS. 9 and 10, this time the rules of creating symbolic links are more complicated. If, for example, the files were originally created in the NLE application Final Cut Pro and a user wants to move them to Premiere application, the software will rename some of the symbolic links so that they have a .mov extension. This will enable media files to be read by the NLE application, e.g., Premiere. It is understood however, that only some files can be renamed. Renaming the wrong files may result in the files being inaccessible to the Premiere application. In no instance are the original files renamed, only the Symbolic Links which can have any name a programmer chooses. For the exemplary case described implementing functionality for moving files from the NLE Final Cut application to NLE Premiere application, the rule is as follows: if a media file created in Final Cut has the form "ClipName-av[or -a or -v]", the symbolic link to the file in the Premiere-accessible directory must have the .mov extension. On the other hand, if the media file created in the NLE Final Cut has the form "ClipName-av[or -a or -v]-SomeNumber", then the symbolic link placed in the Premiere-accessible directory must have the same name as the original file. The reason for this is as follows: in Final Cut, for example, when a user captures DV-resolution clips that are longer than about 10 minutes, the files that get stored on disk are broken up into portions that do not exceed 2 GB. So, a twenty minute clip might consist of two 2 GB portions and one 100 MB portion. The second 2 GB portion, and the 100 MB portion are actually referenced by the first 2 GB portion. A user would only have to open the first 2 GB portion and that would give access to the entire file. If the referenced portions were renamed, the link between the referenced portions and the first portion would be broken. The creation of symbolic links and the renaming of clips is performed for the Project-specific files stored on each RAID array.

Figure 11:
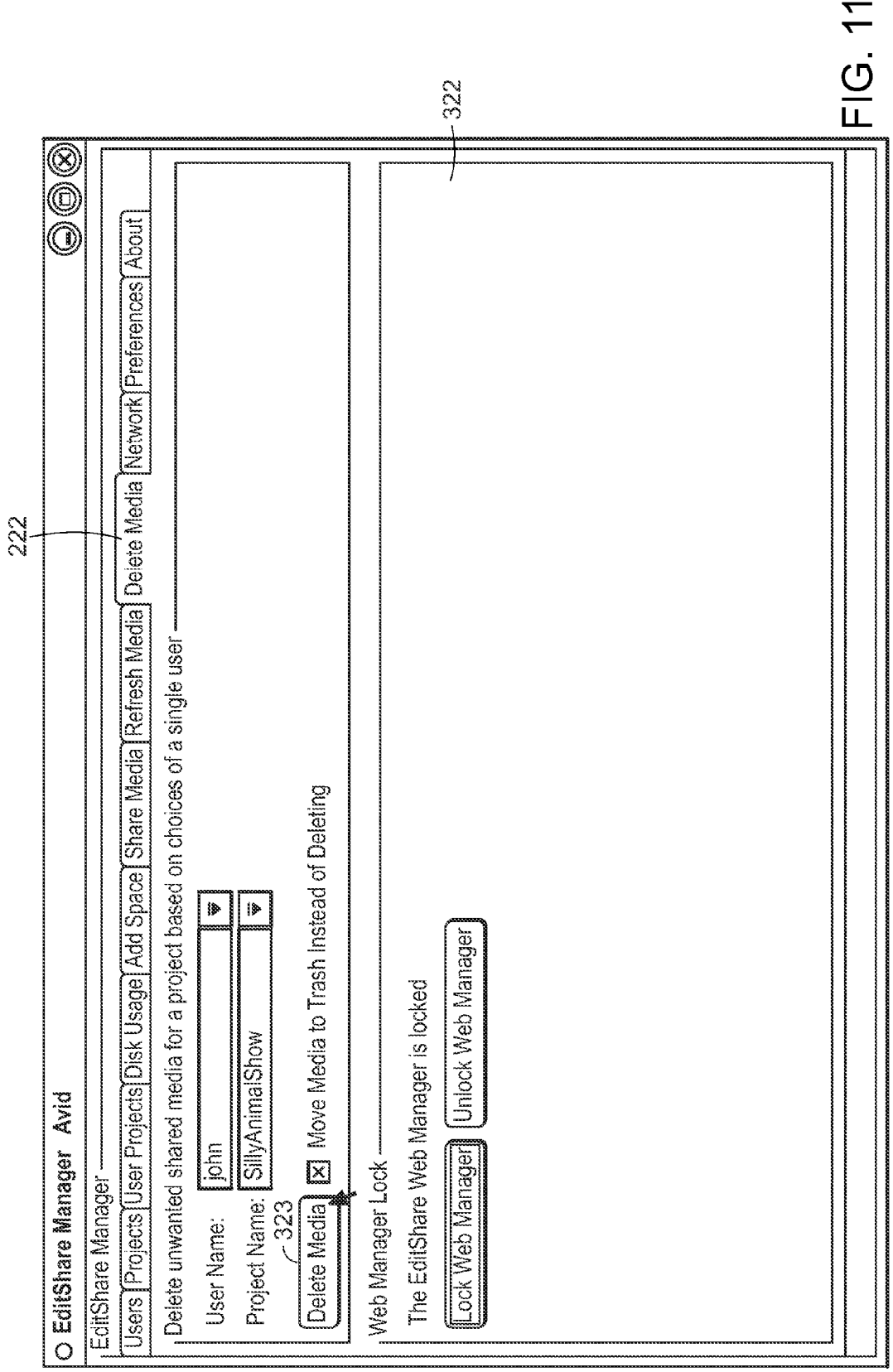
FIG. 11 depicts a novel GUI 322 via which an administrator can specify the deletion of files in the centralized shared storage system according to the invention.

According to a further aspect of the invention, the tool for managing the centralized storage system includes the ability to delete media. In a simple embodiment, a Project Workspace may just be deleted, in which case all actual media files stored within that workspace, as well as all links to those files that were placed inside User Directories, are deleted from the Storage Volume. In the event that it's desired to delete only a portion of the actual media files that are stored in a Project Workspace, the present invention provides a more selective option for deletion. A user may delete files from his/her own client machine. If those files are shared media files, in reality, the user will only be deleting links to the actual media files—and thus no other users will be affected. However, the underlying software of the present invention has a function that can be invoked by any person who has the administrator password and who therefore is capable of running the administrator GUI. The function performs steps of: comparing the links that exist in a chosen user's User Directory with the actual media files in the Shared Media Folder; deletes from the Shared Media Folder any actual media files that didn't have a link in the chosen user's User Directory; and, then deletes all of the corresponding links to those files that might exist in other user's User Directories. With more particularity, an Administrator can: select the Delete Media tab 222 of the Administrator GUI in FIG. 3 which initiates for display the example GUI 322 shown in FIG. 11. From this GUI, the administrator may select the name of the user whose deleting choices will be used for the comparison; select the name of the Project Workspace where the deleting choices will be applied; and click on the Delete Media button 323.

It should be understood that, optionally, whenever shared media files are deleted, the present invention allows the actual media files to be stored indefinitely in a Trash bin, so that if after deletion it is discovered that some needed media files were deleted, it is possible to retrieve them and put them back into a Project Workspace, where users will be able to access those media files again. The present invention also allows unshared media (by definition, actual media files) to be moved to a Trash bin whenever the user who stored the files is removed from the Project Workspace or removed altogether from the system. These "deleting to Trash" capabilities are made possible by the fact that actual deletions are being managed by the server and not by the clients. Were actual files to be deleted by clients, there would be no way to move them to a server-based Trash bin.

Figure 12:
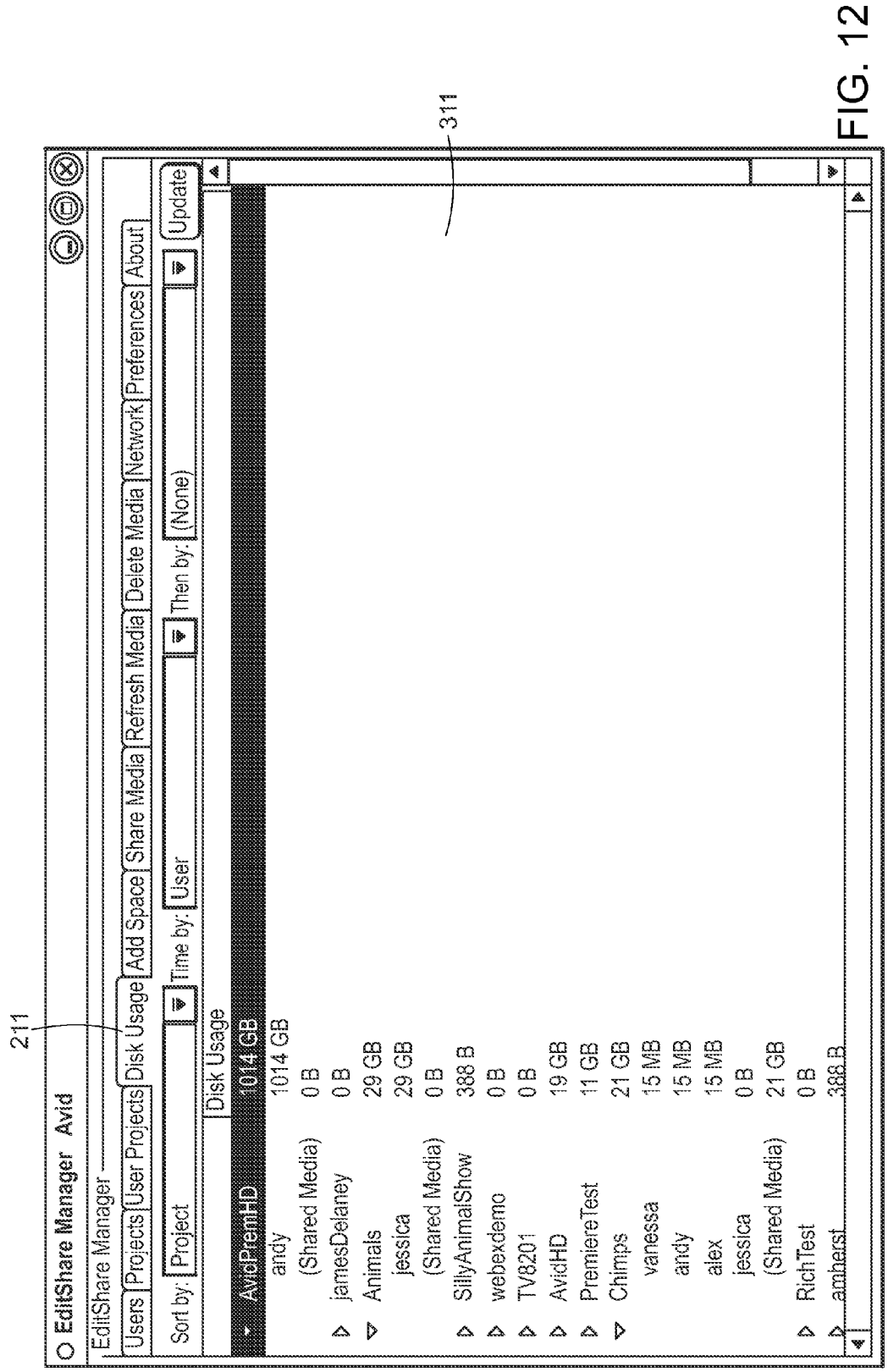
FIG. 12 depicts a novel GUI 311 via which an administrator may access usage status data of a particular storage disk or volume in the centralized shared storage system according to the invention.
Figure 14:
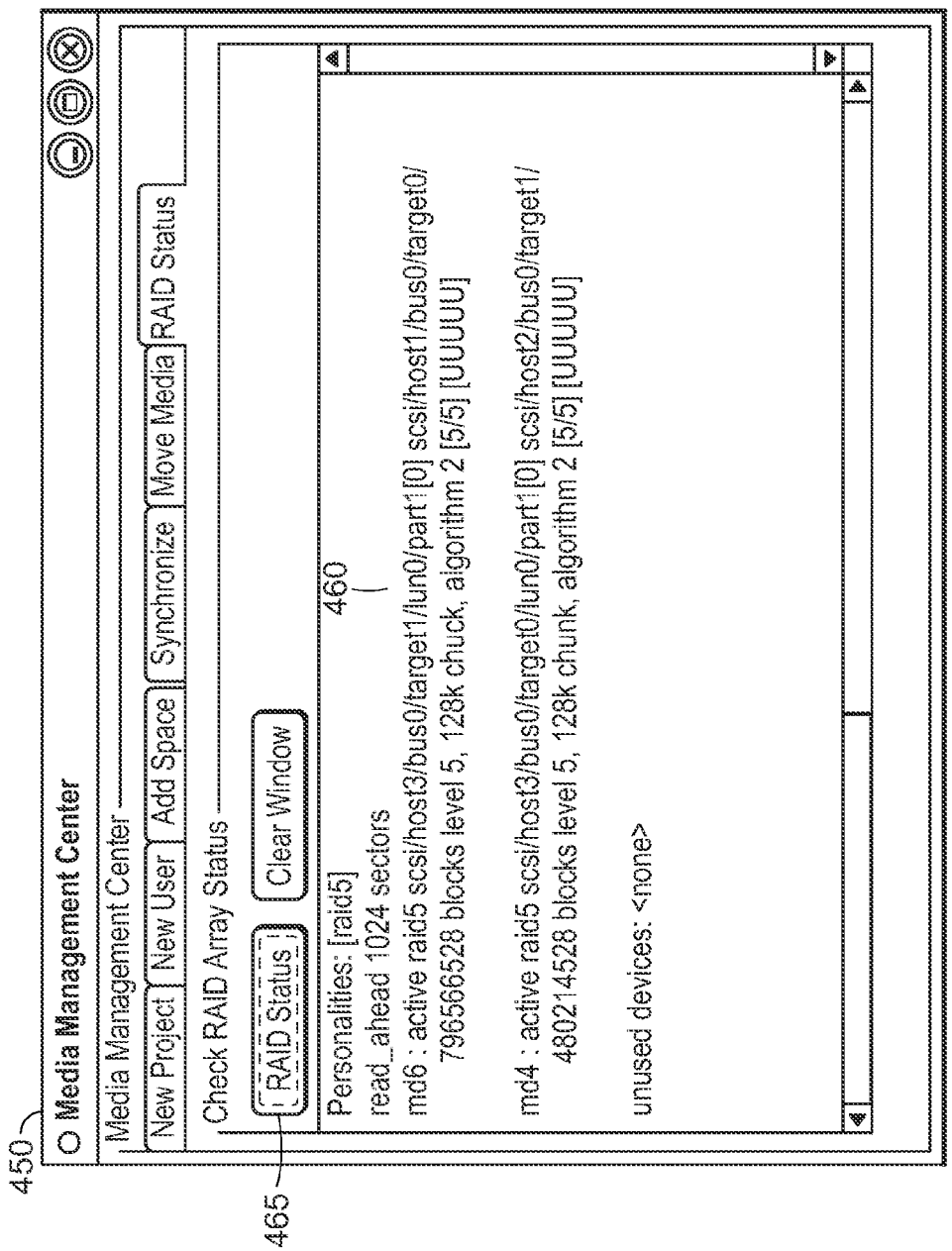
FIG. 14 depicts a novel GUI 460 via which an administrator may access the status of a RAID array used in the centralized storage system of the present invention.

According to a further aspect of the invention, referring back to FIG. 3, selection of the tab 211 generates an interface 311 such as shown in FIG. 12 providing means to view the status, in terms of disk usage, of particular Project Workspaces, particularly the ability to view disk usage at a Project Workspace level and at the User Directory level within a Project Workspace. The tool for managing the centralized storage system further includes the ability to provide a RAID Status. This feature allows a quick check of the status of the system's various RAID arrays by executing a Raid status command 465 (for example, 'cat/proc/mdstat') and displaying the results 460 in the interface display 450 as shown in FIG. 14.

Figure 13:
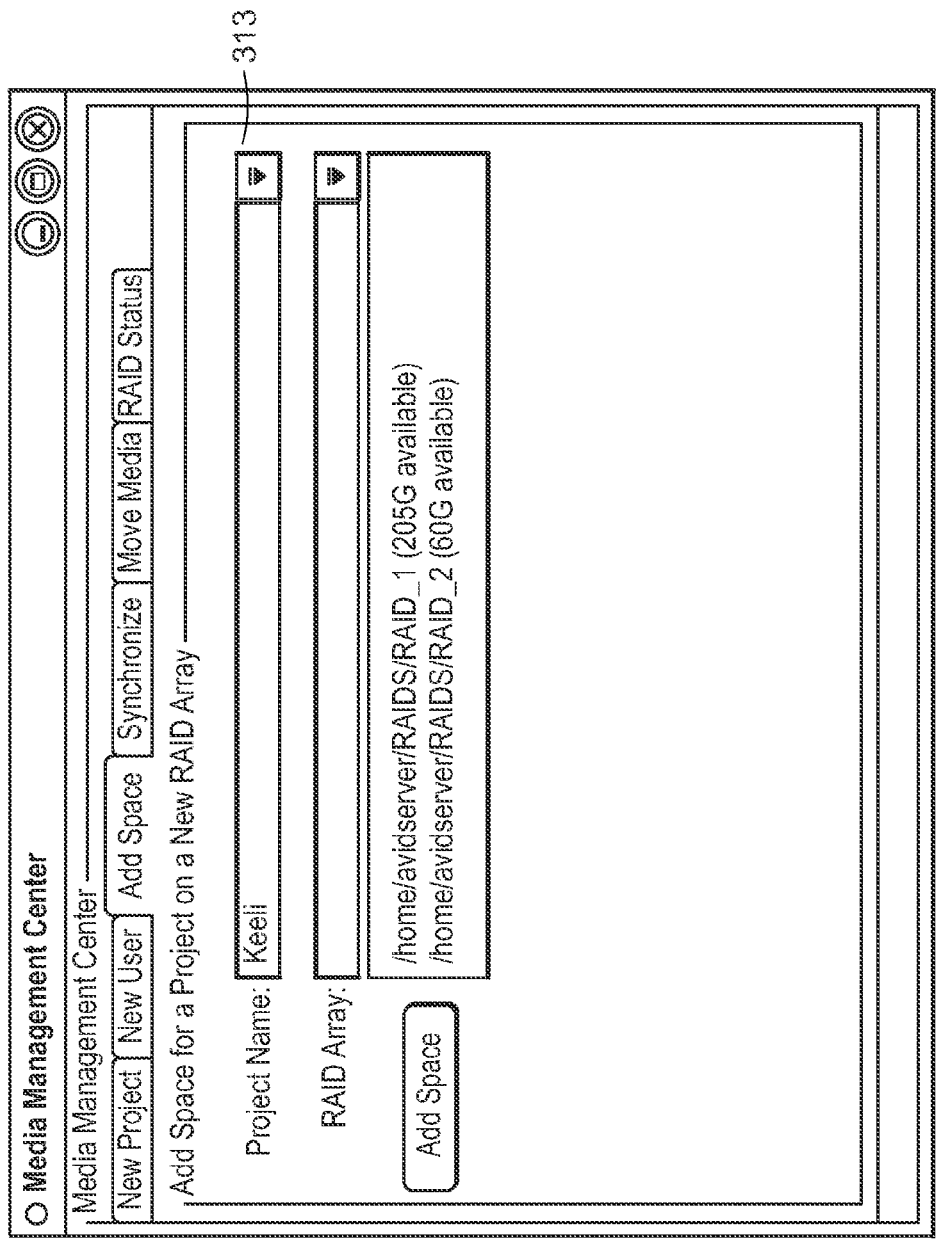
FIG. 13 depicts a novel GUI 313 via which functionality is initiated for extending a Project Workspace onto an additional physical disk media storage device.

Referring back to FIG. 3, selection of the tab 213 generates an interface 313 such as shown in FIG. 13, via which there is provided the ability to extend a Project Workspace onto an additional physical disk media storage device, e.g., RAID array. Thus, as shown in FIG. 13, an administrator may add space for a Project Workspace on a new physical RAID array in the manner as shown for the Add Project feature of FIG. 4, except that the name of the Project Workspace has to be chosen from a list of already active names. It is understood that this feature can be implemented only for choosing those RAID arrays that do not already have a folder for that Project Workspace.

Particularly, to achieve these ends as shown in FIG. 13, and with reference to the example annotated schematic of a RAID directory listing provided hereinbelow, the software will perform a scanning of all data storage devices (e.g., RAID arrays) attached to the server and looks for any directories with names in the format "ProjectName_SomePositiveInteger" (i.e., ProjectName_1). Then the software will cause for display, via display interface 313 presented to an administrator, those names (without the integers) in the Project Name drop down box, allowing administrator to select a Project. Further, the software will cause for display via a "RAID Array" drop down box a list of all RAID arrays connected to the system that do not already have a directory with the chosen Project Name and, in addition, an indication of how much space is available on each array. The user (administrator) will thus be permitted to choose an array. Upon selection of the "Add Space" button, software functionality is implemented to create a new Parent Project Directory on the new Array, automatically giving that directory an extension with the next integer, e.g., in the form "ProjectName_LastPositiveIntegerUsedForProject+1". Additional software functionality is implemented to recreate the directory structure found, in the directory "ProjectNameLowestPositiveInteger", typically "ProjectName_1". Thus the new Project Workspace directory provided on the new RAID array will have all the subdirectories and user-specific User Directories that are detected in the first directory that was created for the Project Workspace.

According to a further aspect of the invention, the tool for managing the centralized storage system includes the ability to create and repair a RAID media storage drive, particularly providing substantial automation in configuring and initializing new RAID 0 or RAID 5 arrays. It also evaluates any failures in a RAID array and provides a simple interface for instructing the system to repair the array by either using the same disks or replacing a faulty disk drive.

Illustrating the end result of the functionality depicted in FIGS. 3-9, the following represents an annotated schematic depicting the layout of directories and files on a typical RAID array on a centralized collaborative storage system as enabled by the present invention. Note that each User Directory (e.g., /Avid/ProjectWorkspace1_1/ User1_ProjectWorkspace1_1- /Avid/ProjectWorkspace1/ User4_ProjectWorkspace1_1) contains subfolders and files that duplicate the names found in the parent Shared Media Folder (e.g., /Avid/ProjectWorkspace1_1), and that each User Directory includes media database files adapted for the particule OS that is accessing that User Directory, a set of media files with duplicate names, and in some cases temp files with duplicate names. According to the invention, none of these files will conflict with one another because they are isolated in separate directories. Yet, indicated within each of those isolated directories are the symbolic links to the files that each individual workstation needs to see.

In the example scenario of Final Cut Pro systems sharing media (e.g., /FCP/ProjectWorkspace4_1), each User Directory (e.g., /FCP/ProjectWorkspace4_1/ User1_ProjectWorkspace4_1-/FCP/ProjectWorkspace4_1/ User4_ProjectWorkspace4_1) contains subfolders and files that mimic the names found in the parent Shared Media Folder (e.g., /FCP/ProjectWorkspace4_1).

In the example scenario of Premiere and Final Cut Pro sharing media (e.g., /OtherNLE/ProjectWorkspace3_1), all users (e.g., /OtherNLE/ProjectWorkspace3_1/ User1_ProjectWorkspace3_1 and /OtherNLE/ProjectWorkspace3_1/User4_ProjectWorkspace3_1)—regardless of which NLE platform they are working on—are accessing symbolic links. The symbolic links have the appropriate extensions (e.g., *.mov) so that the desired NLE application recognizes the files as being readable by application.

```
RAIDS/RAID_1 (a physical array of drives 1 TB in size)
    /Avid/
        /ProjectWorkspace1_1          PARENT FOLDER FOR PROJECT WORKSPACE 1
            /OMFI MediaFiles                  Shared Media Folder
                Files*.omf                    (actual media files)
                Files*.aif                    (actual media files)
                /Creating (subdirectory)      NEVER USED
            /User1_ProjectWorkspace1_1        User 1 User Directory
                /OMFI MediaFiles              Media Directory for User 1
                    Files*.omf                (symlinks)
                    Files*.aif                (symlinks)
                    103ADBAFG.4392870.omf     Real video file not yet moved up
                    102ADBAF0.4392871.aif     Real audio file not yet moved up
                    msmFMID.pmr               Avid User 1's media index
                    msmMMOB.mdb               Avid User 1's media database
                    /Creating (subdirectory)
                        temp01.omf            Temp media file during capture
                        temp02.omf            Temp media file during capture
                        temp01.aif            Temp media file during capture
            /User2_ProjectWorkspace1_1        User 2 User Directory
                /OMFI MediaFiles
                    Files*.omf                (symlinks)
                    Files*.aif                (symlinks)
                    msmFMID.pmr               Avid User 2's media index
                    msmMMOB.mdb               Avid User 2's media database
                    /Creating (subdirectory)
                        temp01.omf            Temp media file during capture
                        temp02.omf            Temp media file during capture
                        temp01.aif            Temp media file during capture
            /User3_ProjectWorkspace1_1        User 3 User Directory
                /OMFI MediaFiles
                    Files*.omf                (symlinks)
                    Files*.aif                (symlinks)
                    msmFMID.pmr               Avid User 3's media index
                    msmMMOB.mdb               Avid Deer 3's media database
                    /Creating (subdirectory)
            /User4_ProjectWorkspace1_1 (Mac User)   User 4 User Directory
                .AppleDB                      Hidden Mac File
                .AppleDouble                  Hidden Mac File
                .DS_Store                     Hidden Avid Mac File
                /OMFI MediaFiles
                    Files*.omf                (symlinks)
                    Files*.aif                (symlinks)
                    ._msmFMID.pmr             Avid Mac User 4's media index
                    ._msmMMOB.mdb             Avid Mac User 4's media database
                    /Creating (subdirectory)
```

-continued

| | | |
|---|---|---|
| /ProjectWorkspace2_1 | | PARENT DIRECTORY FOR PROJECT WORKSPACE 2 |
| /OMFI MediaFiles | | Shared Media Folder |
| Files*.omf | | SAME AS ABOVE |
| Files*.aif | | |
| /Creating | | |
| /User1_ProjectWorkspace2_1 | | User 1 User Directory |
| /OMFI MediaFiles | | |
| Files*.omf | | (symlinks) |
| Files*.aif | | (symlinks) |
| /Creating | | |
| /User3_ProjectWorkspace2_1 | | User 3 User Directory |
| /OMFI MediaFiles | | |
| Files*.omf | | (symlinks) |
| Files*.aif | | (symlinks) |
| /Creating | | |
| /RAIDS/RAID_1 | | |
| /FCP/ | | |
| /ProjectWorkBpace4_1 | | PARENT DIRECTORY FOR PROJECT WORKSPACE 4 |
| /Capture Scratch | | Shared Media File Folder |
| /ProjectWorkspace4 | | Place where Final cut names proj |
| Clip1-av | | Real Quicktime file |
| Clip2-av | | Real Quicktime file |
| Clip2-av-1 | | Part 2 of Clip 3 - Real file |
| Clip3-av | | Real Quicktime file |
| Clip3-av-1 | | Part 2 of Clip 3 - Real file |
| Clip3-av-2 | | Part 3 of Clip 3 - Real file |
| /Render Files | | Location of Rendered Effects |
| /Audio Render Files | | Location of Rendered Audio |
| /User1_projectWorkspace4_1 | | User 1 User Directory |
| /Capture Scratch | | |
| /ProjectWorkspace4 | | Proj Folder created by FCP |
| Clip1-av | | symlink |
| Clip2-av | | symlink |
| Clip2-av-1 | | Part 2 of clip 3 - symlink |
| Clip3-av | | symlink |
| Clip3-av-1 | | Part 2 of Clip 3 - symlink |
| Clip3-av-2 | | Part 3 of Clip 3 - symlink |
| /Render Files | | symlink or Real Video Effects |
| /Audio Render Files | | symlink or Real |
| /User2_ProjectWorkspace4_1 | | User 2 User Directory |
| Capture Scratch | | |
| /ProjectWorkspace3 | | Proj Folder created by FCP |
| Clip1-av | | symlink |
| Clip2-av | | symlink |
| Clip2-av-1 | | Part 2 of Clip 3 - symlink |
| Clip3-av | | symlink |
| Clip3-av-1 | | Part 2 of Clip 3 - symlink |
| Clip3-av-2 | | Part 3 of Clip 3 - symlink |
| /Render Files | | symlinks or Real Video Effects |
| /Audio Render Files | | symlink or Real |
| /RAIDS/RAID_1 | | |
| /OtherNLE/ | | |
| /ProjectWorkspace3_1 | | Parent Directory for Project Workspace 3 |
| Final Cut Files | | |
| /Capture Scratch | | Shared Media Files |
| /ProjectWorkspace3 | | Folder created by FCP |
| Clip1-av | | Real Quicktime file |
| Clip2-av | | Real Quicktime file |
| Clip2-av-1 | | Part 2 of Clip 3 - Real file |
| Clip3-av | | Real Quicktime file |
| Clip3-av-1 | | Part 2 of Clip 3 - Real file |
| Clip3-av-2 | | Part 3 of Clip 3 - Real file |
| /Render Files | | Location of Rendered Effects |
| /Audio Render Files | | Location of Rendered Audio |
| /Premiere Media Files | | Shared Media Files |
| Clip1-Premiere.mov | | Real Quicktime files |
| Clip2-Premiere.mov | | Real Quicktime files |
| User1_ProjectWorkspace3_1 | | User 1 User Directory |
| /Capture Scratch | | |
| / ProjectWorkspace3 | | Folder created by FCP |
| Clip1-av | | symlink |
| Clip2-av | | symlink |
| Clip2-av-1 | | Part 2 of clip 3 - symlink |
| Clip3-av | | symlink |
| Clip3-av-1 | | Part 2 of Clip 3 - symlink |
| Clip3-av-2 | | Part 3 of Clip 3 - symlink |
| Clip1-Premiere | | symlink to Premiere File |
| Clip2-Premiere | | symlink to Premiere File |

-continued

| | |
|---|---|
| /Render Files | symlink or Real Video Effects |
| /Audio Render Files | symlink or Real Audio Renders |
| /User4_ProjectWorkspace3_1 | User 4 User Directory |
| Premiere Media Files .mov/ | NOTE: Not all files have |
| Clip1-av.mov | symlink NOTE RENAMING WITH .mov |
| Clip2-av.mov | symlink NOTE RENAMING WITH .mov |
| Clip2-av-1 | Part 2 of clip 3 - symlink |
| Clip3-av.mov | symlink NOTE RENAMING WITH .mov |
| Clip3-av-1 | Part 2 of Clip 3 - symlink |
| Clip3-av-2 | Part 3 of clip 3 - symlink |
| Clip1-Premiere.mov | symlink to Premiere File |
| Clip2-Premiere.mov | symlink to Premiere File |

In sum, the invention provides a valuable solution for NLE video editing workstations and other hardware that can access digital media files in operative communication with a single centralized media storage system. It should be understood that the present invention may be implemented on any centralized computer platform (server or otherwise) that supports "Symbolic Links" and/or "Hard Links", that allows connections with high speed storage, and that allows Windows and Macintosh and/or other workstations to be connected to the centralized computer platform either in a "client/server networking arrangement" or in a "Storage Area Network" arrangement where the shared storage simply appears on the workstations as "local external storage". Further, to have many machines accessing the same files, the system must include the high speed intermediary server device between them that can perform the virtualization actions in a manner that is virtually transparent to the client machines. Thus, the virtualization "pseudo code" described herein may be translated into many different programming languages (e.g., C++, Python, Perl, etc.) as long as it may run on that particular platform.

The inventive use of the "symbolic link" virtualization scheme of the invention further enables the collaborative storage system to set up a structure that allows non-linear video editors, such as AVID's Xpress Pro® HD Non Linear Editing (NLE) application, to share the same "Project" in addition to sharing the same media files. In the context of the invention, a "Project" is comprised of metadata that includes bins and sequences and "clips" that all refer to media files, but the contents of Projects are not media files themselves. Fortunately, for editors who use Avid non-linear video editing applications, the Project data created by most Avid non-linear video editing applications is not stored in single monolithic files, as it is with many other popular non-linear editing applications like Apple's Final Cut Pro, Avid® Projects by design are typically broken up into many discrete elements that at the operating system level are really just filesystem folders and files. Thus, in Avid® Projects, it is possible to manipulate these discrete elements individually. For example, it is possible to set write permissions differently on one folder or file versus others. And by the symbolic link technique described herein, it is possible to create different "virtual views" of an Avid® Project, such that each user has an optimized view of the Project and each user can maintain his/her own separate files for the same function (i.e., for settings). The following description will refer specifically to manipulating Avid® Projects, although the invention could be used with any other non-linear video editing application that stored Project data in discrete files and folders and not in a single monolithic Project File.

FIGS. 15-31 particularly depict how the tool for managing the centralized storage system further provides the ability to create a special environment where non-linear video editing Projects can be shared by multiple editors such that 1) the work of each editor is easily accessible to colleagues on a Read Only basis—that is, it can be viewed and duplicated, but not changed; 2) editors working in a Shared Project can completely hide some work from colleagues; 3) editors each get their own customized view of the Shared Project; 4) editors can cede Write Authority to colleagues by moving their work to an unprotected area; 5) each editor maintains his/her own Settings files for the project, as well as statistics and trash bins.

Figure 15:
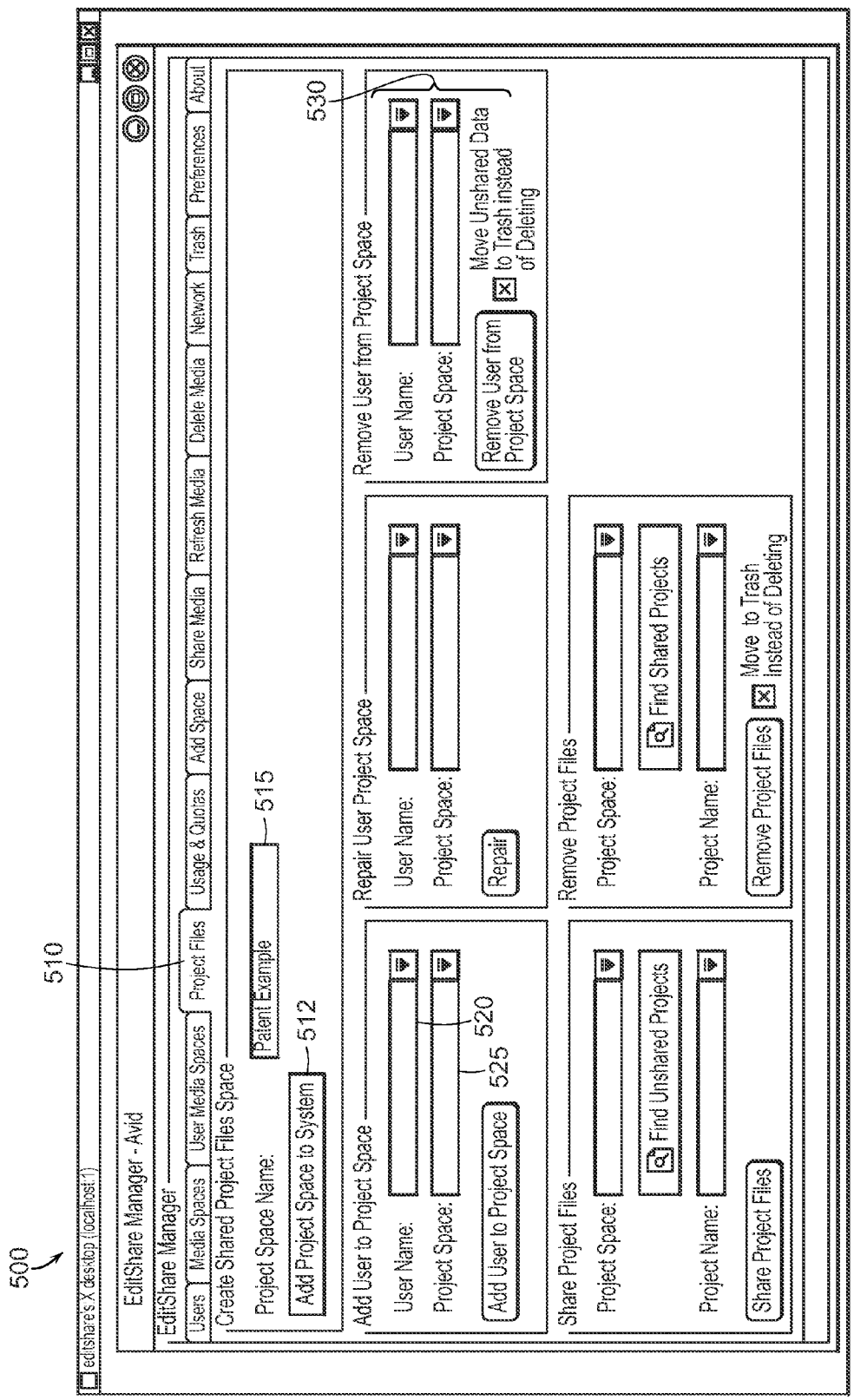
FIG. 15 depicts a novel GUI 500 via which an administrator may create a "shared" non-linear video editing project according to the invention.

FIG. 15 in general depicts a further embodiment of the system administrator GUI 500 via which functionality is initiated for enabling management of the centralized shared storage systems for collaborative non-linear editing and management of "Projects" according to a further aspect of the invention. Via interface 500, selection of the "Project Files" tab 510, enables an administrator to create an environment on the centralized shared storage system that can support a "Shared Project". First, via interface 500, selection of button 512 enables an administrator to create a project "space" on the system server to contain the project. In the exemplary interface 500 of FIG. 15, the defined space is given a name by the user via entry field 515. It is understood that this "space" is just a standard Linux directory, however, any normal Project created in this directory is detected by the shared Project enabling software provided by the tool. Subsequently, at the option of the user who created the project, or at the option of the system administrator, the un-shared Project can be transformed into a "Shared Project".

There is no practical limit to the number of individual "Shared Project" spaces that can be created on the server. Each space can have a different group of editors assigned as "members" of the space. Thus, different configurations of groups can share different Projects. FIG. 15 depicts generally the entry fields 520 and 525, respectively enabling the addition of an editor (user) to a Project Space. Each entry field 520 and 525 is provided with a respective drop-down menu enabling selection of available users and created Project spaces. Just as easily as users (e.g., editors) may be added, users may be removed from any Project Space at any time via the interface via drop-down menu choices for entry fields 530 enabling selection of users to be removed from any Project space.

Figure 16:
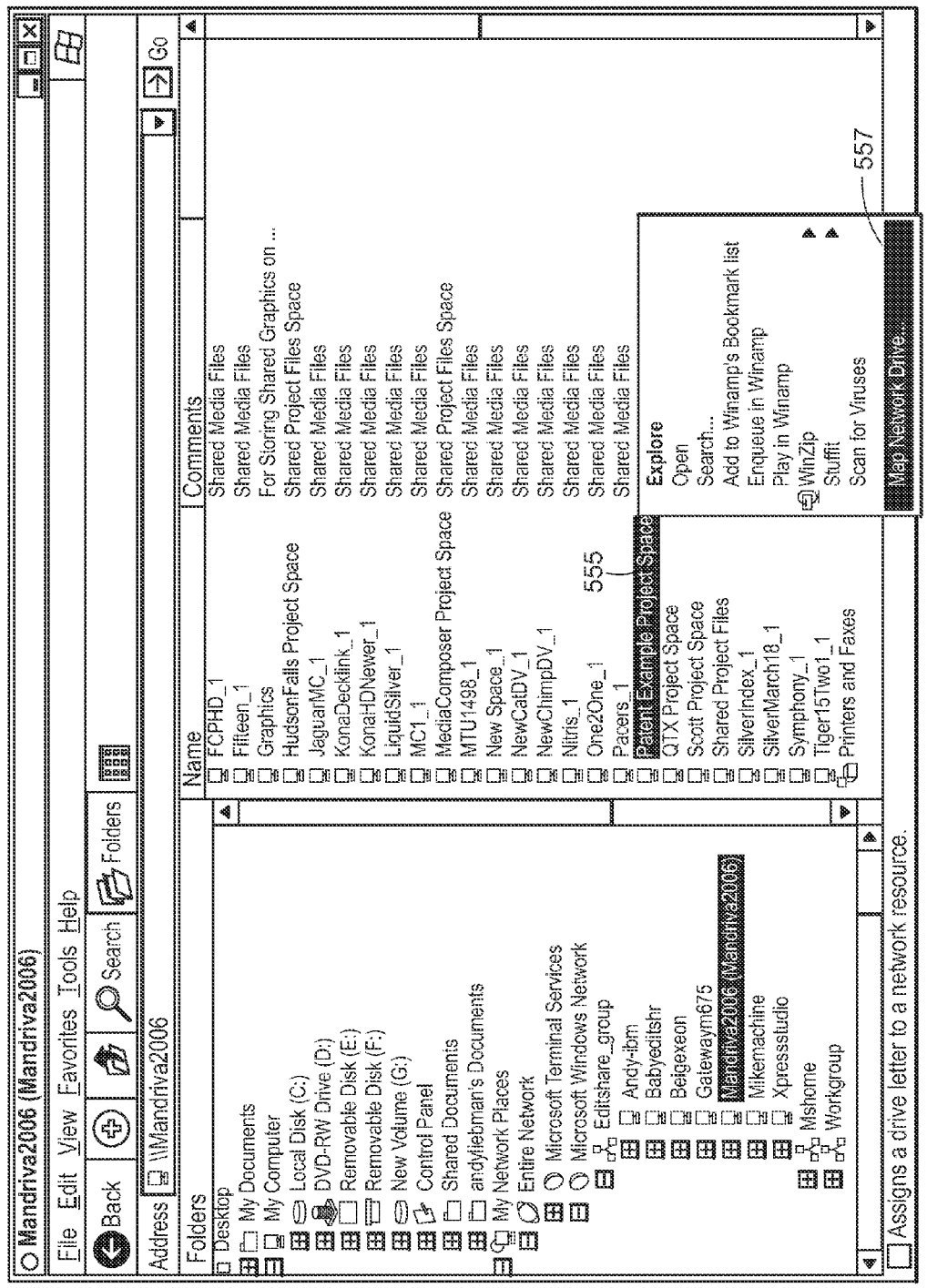
FIG. 16 depicts an example Windows Explorer interface 550, enabling a user to map a created "Project Space" to a network drive or volume.

Continuing to FIG. 16, each time a user is added to a Project Space, a network share (e.g., a "Linux Samba share that can be accessed by any Windows networking client) is automatically created so that the user can access the space via the network. A specific share is created for each user who has been added to the Project Space, so that each user can access his/her own unique "virtual view" of the Project Space. Creating individual network shares for every member of a Project Space allows all users to see some common elements inside the Project Space, but, in addition, enables the user to see some elements that are unique to that user. Users can search for and mount the Project Spaces using many techniques. Via the example Windows Explorer interface 550, shown in FIG. 16, a user has found the example "Patent Example Project Space" 555 using the Windows Explorer browser. Once finding the share, it may be "mapped as a network drive" as shown at 557. That is, the share can be given a network drive letter so that it appears as a volume on the user's workstation. It is understood that users working from Apple's OS X operating system may use similar procedures (although with OS X, mounted network volumes do not get "drive letters", as OS X does not use the drive letter metaphor for naming volumes).

Figure 17:
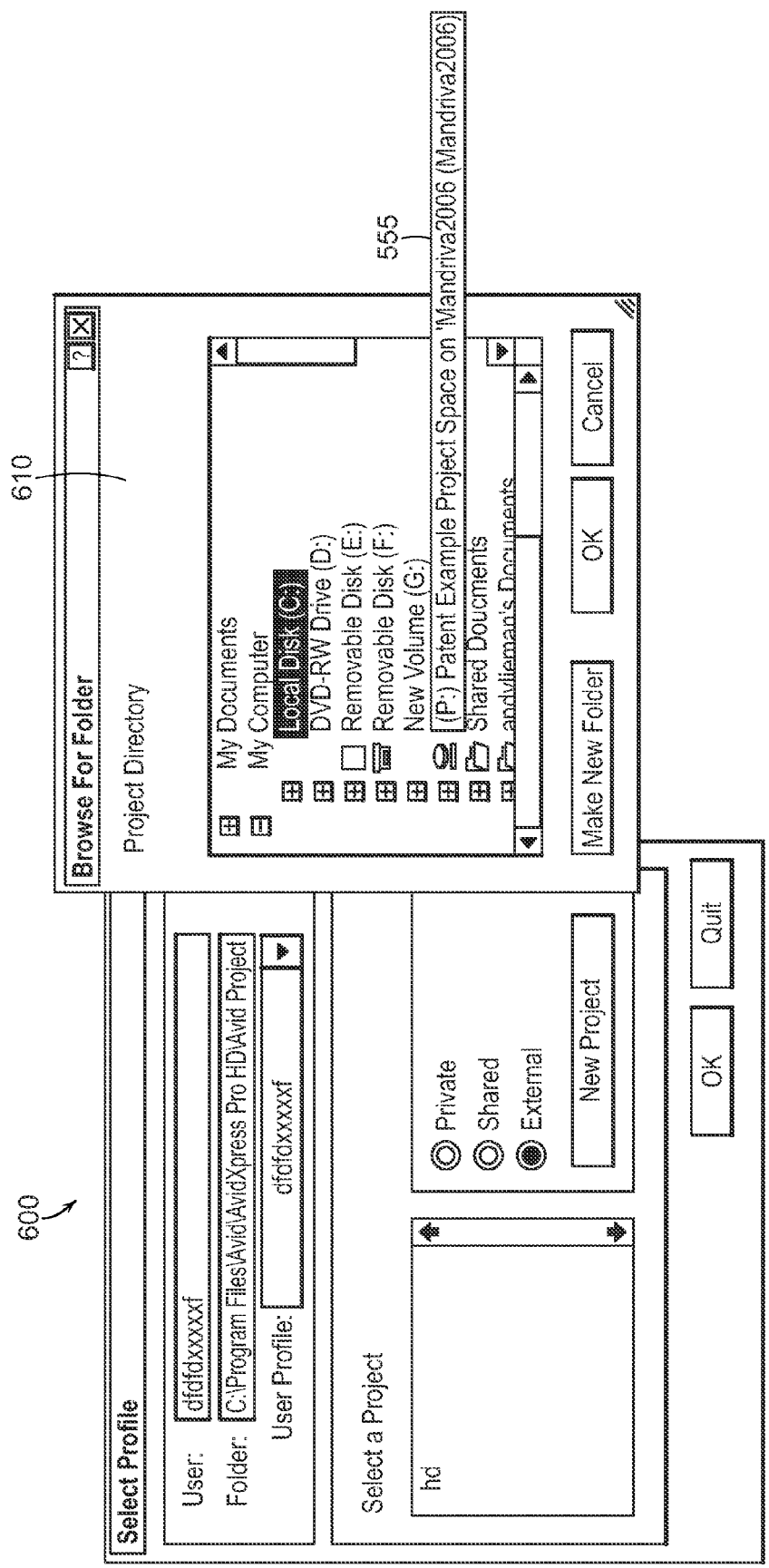
FIG. 17 illustrates an example "Open Project" dialog box displayed via Avid's Xpress® Pro HD Non Linear Editing (NLE) application interface that is presented for selecting a project.

After mapping the shared project space to a network drive, the project may be opened by users directly from the NLE application. FIG. 17 illustrates an example "Open Project" dialog box 610 displayed via Avid's Xpress® Pro HD Non Linear Editing (NLE) application interface 600 that is presented for selecting a project. Here, a user is indicating to the Avid NLE application that the user wants to create a New Project on the "P Drive", which is really a network share representing that user's "virtual view" of the previously created "Patent Example Project Space" 555 on the server.

Figure 18:
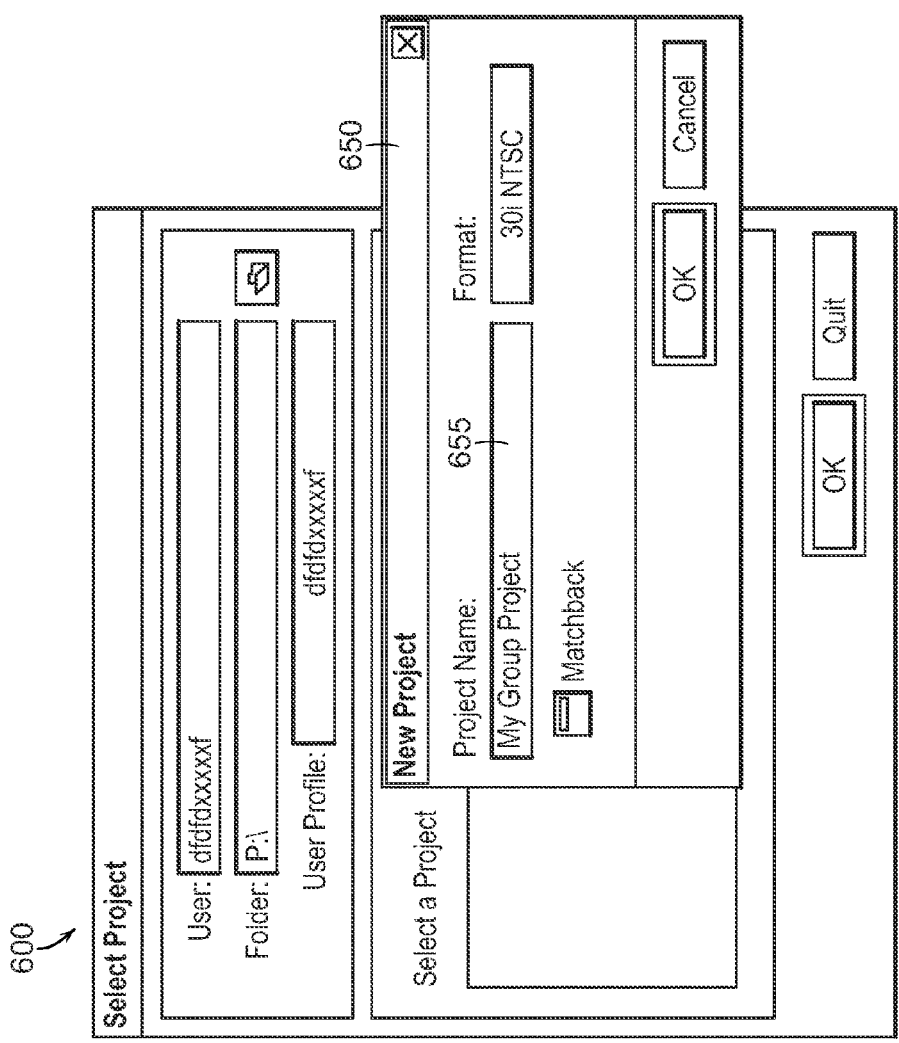
FIG. 18 illustrates an example "New Project" creation dialog box displayed via Avid's Xpress® Pro HD NLE application interface in accordance with the invention.

Continuing to FIG. 18, there is depicted an example "New Project" creation dialog box 650 displayed via Avid's Xpress® Pro RD NLE application interface 600. As depicted in FIG. 18, the user has created an example group project 655 named "My Group project". After creating this new Project called "My Group Project", the application (e.g., Avid's Xpress® Pro HD NLE application) opens and shows the typical view users normally are presented with when creating a project on a local drive. According to the example described herein, there is caused for display a single "default name" BIN—a place to put clips and sequences—called "My Group Project Bin". There is automatically generated a single "default name" BIN comprising a place to put clips and sequences, which, for exemplary purposes, is referred to herein as "My Group Project Bin".

Figure 19:
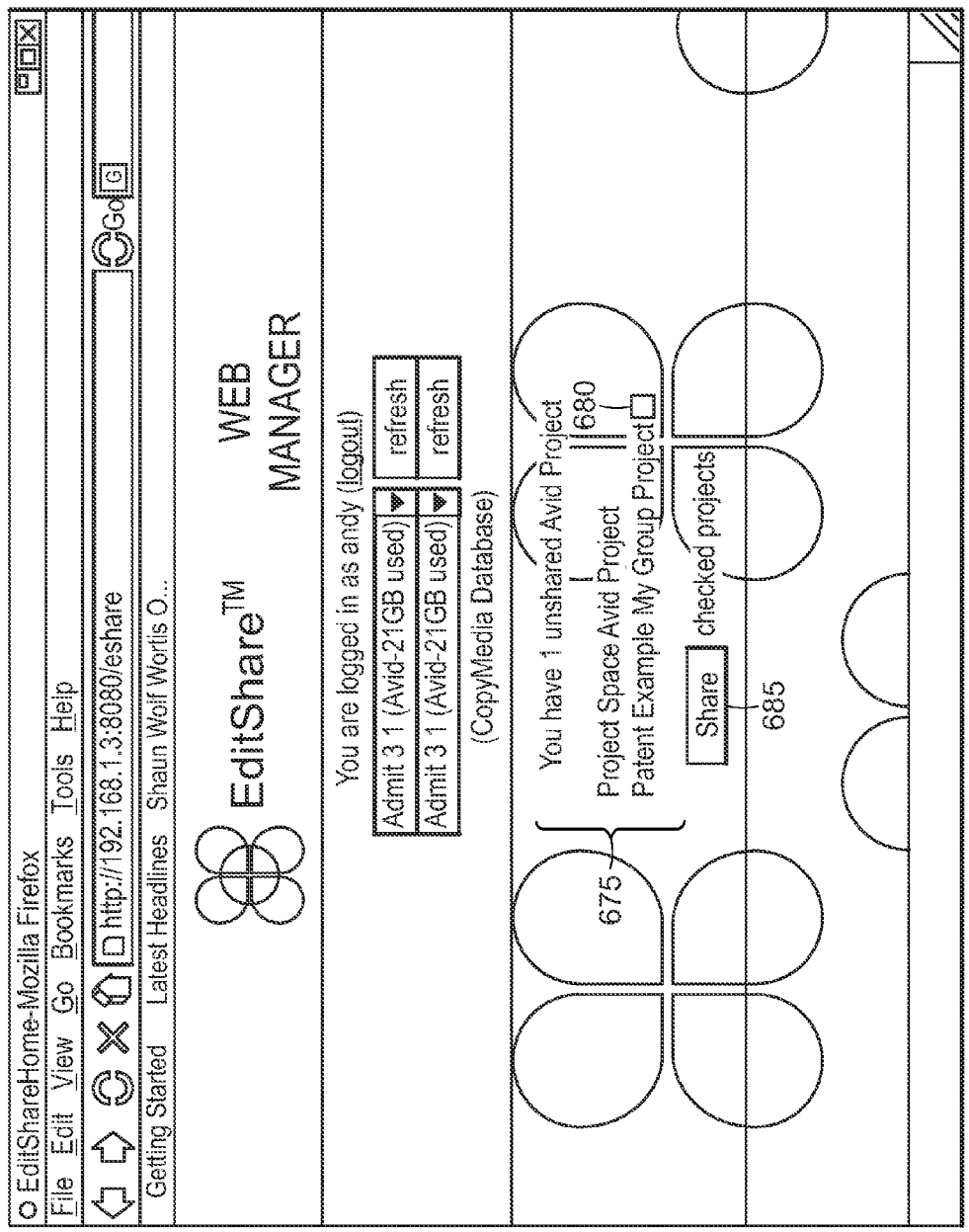
FIG. 19 depicts an example web page interface 415 that enables a user to share media and projects in the centralized shared storage system according to the invention.

Referring now to FIG. 19, which corresponds to the web page interface 415 that enables a user to share media in the centralized shared storage system according to the invention as depicted and described herein with respect to FIG. 7, there is depicted a user's access to the system server via the system's Web Manager software. As shown in FIG. 19, the Web Manager interface 415 indicates at 675 that the shared project software module has detected the creation of a new Avid® Project called "My Group Project" in the "Patent Example Project Space". That user now has the option at this point of "sharing" the project so that other editors can participate in it—by checking the box 680 next to the Avid® Project name and clicking on the provided "Share" button 685, or, keeping the project "unshared" by doing nothing. In this example, the user has selected button 685 to share the Project.

Figure 20:
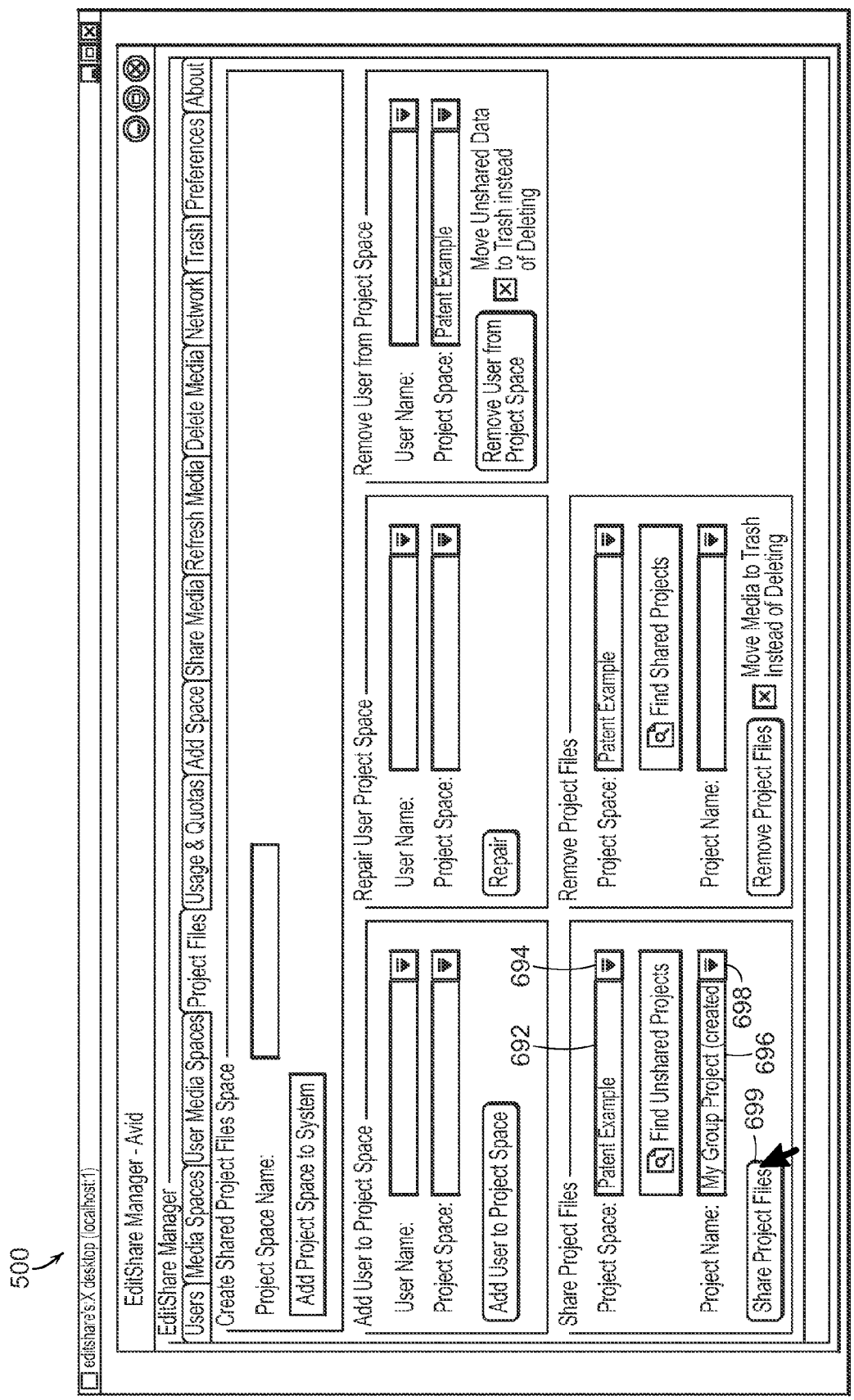
FIG. 20 depicts the system Administrator's GUI 500 enabling an Administrator to convert an "unshared Project" into a "Shared Project" according to the invention.

As now depicted in FIG. 20, via the system Administrator's GUI 500, the Administrator is further provided with the ability to convert an "unshared Avid® Project" into a "Shared Avid® Project". Particularly, the Administrator may select a Project Space 692 via a drop down menu 694, in the example depicted, the "Patent Example" project space. Further, the Administrator may select via drop-down menu 698 an unshared project 696, in the example depicted, the previously created "My Group Project". Upon Administrator selection of the Share Project Files button 699, the shared project software module functionality is invoked for rendering the created (unshared) project to a "shared" status.

Figure 21:
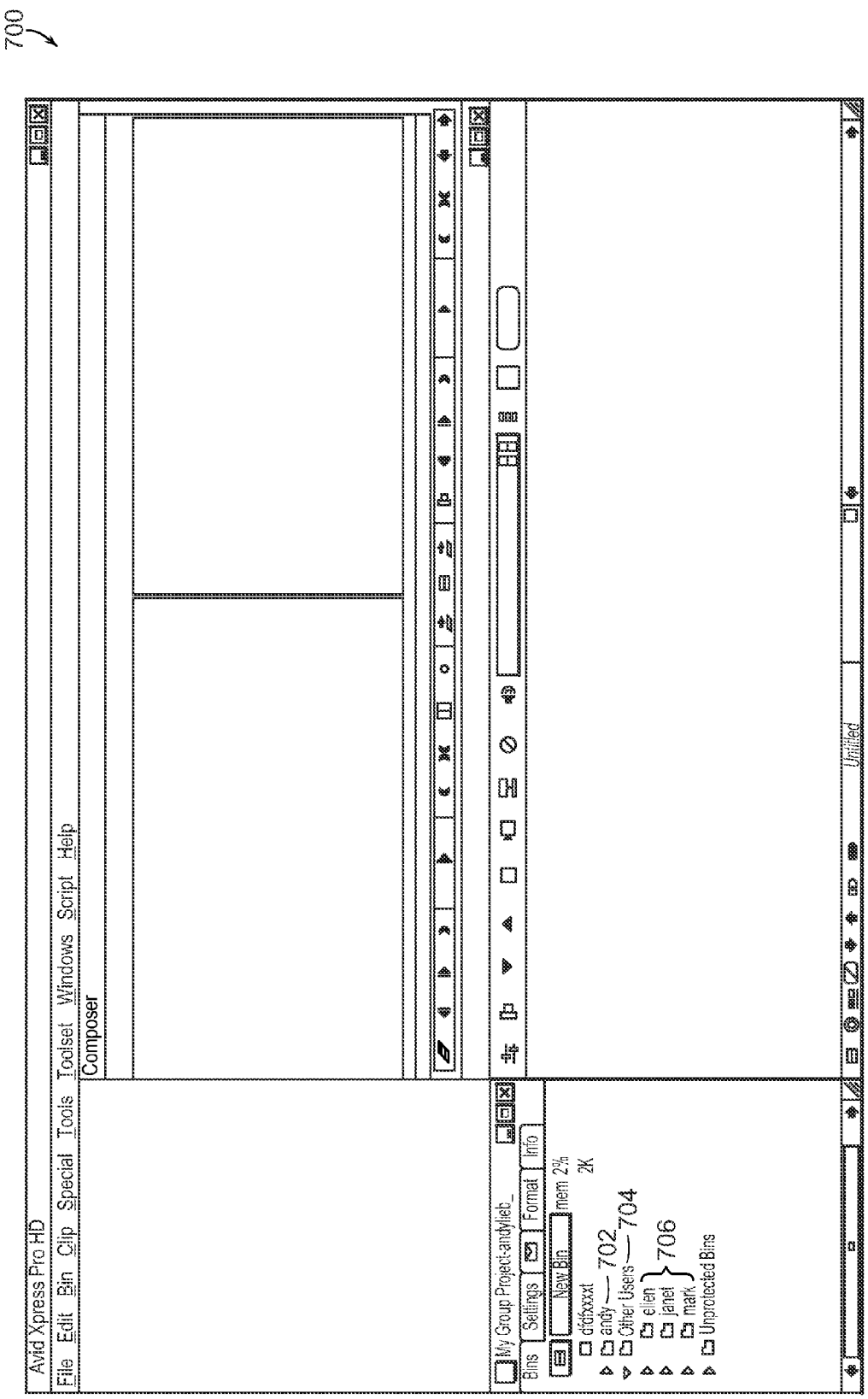
FIG. 21 depicts an example opened Avid® application interface 700 modified in accordance with the shared project software module functionality of the present invention.

FIG. 21 depicts an example opened Avid® application interface 700 modified in accordance with the shared project software module functionality of the present invention. Particularly, FIG. 21 illustrates that when an Avid® Project is converted into a Shared Avid®Project via the shared project software module of the invention, the software creates for each user who is a member of the Avid® Shared Project Space (in the example depicted, the "Patent Example Project Space") a personal folder within the Avid® Project. Because of the specific way the shared project software module creates unique "virtual views" of the Avid® Shared Project space for each user, the user will see his/her own folder 702 at the upper level of the Avid® Project, and all other user's folders 706 will appear inside an "Other Users" folder 704. It is understood that the "other" users sharing this project have been previously added to Project space via the system administrator GUI 500 shown in FIG. 15.

Figure 22:
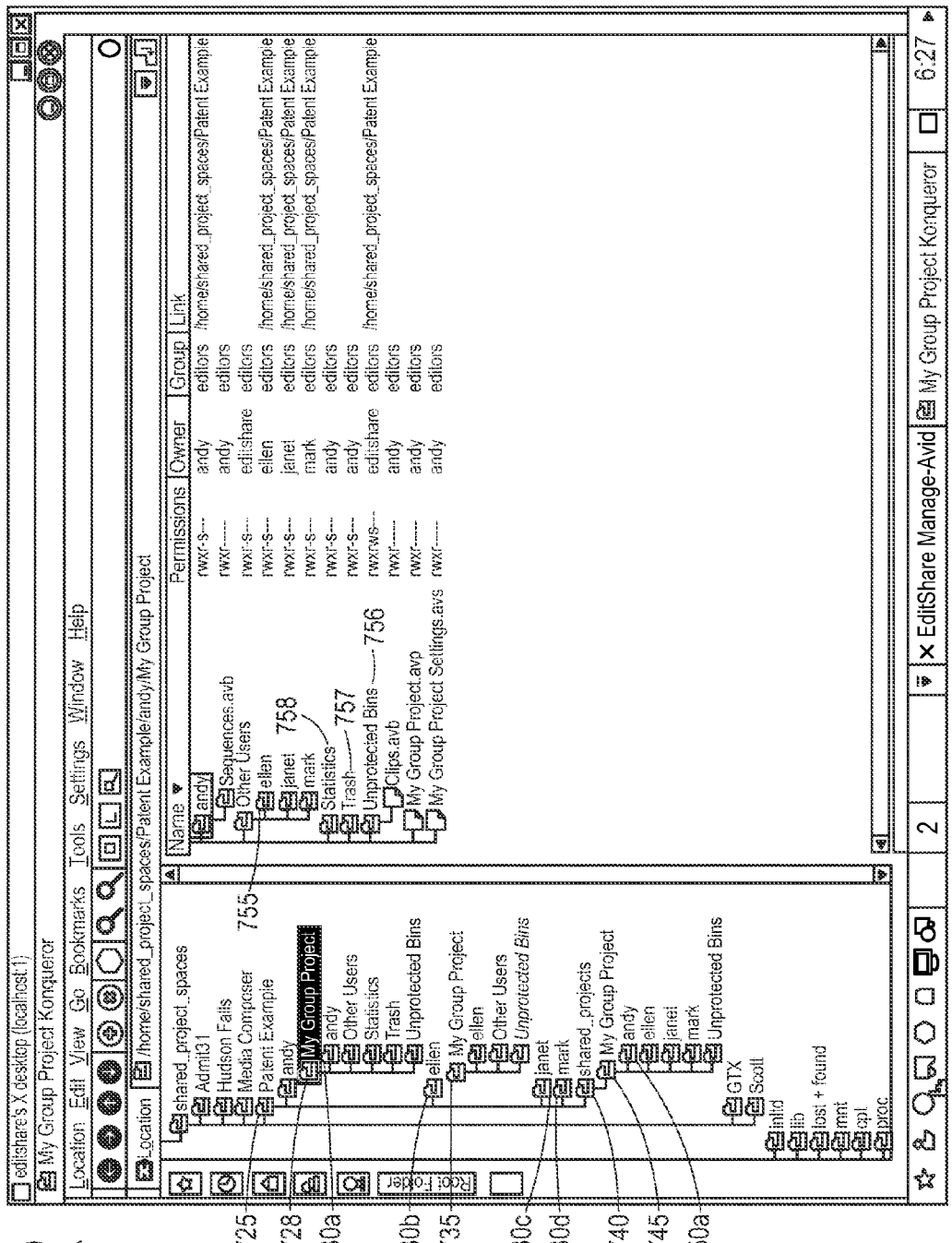
FIG. 22 depicts an exemplary Linux File Manager interface 720 that graphically depicts the structure that the shared project software module of the invention automatically creates when setting up Shared Projects according to the present invention.

FIG. 22 depicts an exemplary Linux File Manager interface 720 that graphically depicts the structure that the shared project software module of the invention automatically creates when setting up Shared Projects. As is seen in FIG. 22, inside "shared_project_spaces" folder 725, there is a directory created for each Shared Project Space. Thus, there exists a separate directory 728 for the "Patent Example" Project Space created for the example described herein. Inside the "Patent Example" directory there is a folder for each "User" (in the example depicted, "Andy", "Ellen", "janet" and "mark", respectively, 730a-730d). Each of these folders corresponds to a specific "network share" that is exported on the network and visible only to its corresponding user. The various User Directories and their corresponding network shares provide a "virtual view" for each User of the Shared Project Space. Inside these "virtual views" is a directory for each Avid® Project that has been shared. Thus, for the "My Group Project" 729 (the Shared Avid® Project created in the depicted example described herein), each User has a unique "My Group Project" directory representing his/her own view of that Project. The right hand side of FIG. 22 illustrates the "My Group Project" directory 729 for the user "Andy". As can be seen at the extreme right hand side of the Linux File Manager, under the "Link" column, all of the "User Folders" inside Andy's view of the "My Group Project" directory are symbolic links that point to "Real" folders residing inside a parallel "My Group Project" directory 745 located in a /shared_projects/My Group Project folder 740 that is never accessed directly by any Users. Thus, the directory "/shared_project_spaces/Patent_Example/Andy/My Group Project/Andy" 730a is actually a symbolic link to "/shared_project_spaces/Patent_Example/shared_projects/My Group Project/Andy" 750a and, in the example depicted in FIG. 22, the "/shared_project_spaces/Patent_Example/Andy/My Group Project/Other Users/Ellen" directory 755 is a link to "/shared_project_spaces/Patent_Example/shared_projects/My Group Project/Ellen".

By setting up such a system of links, in view of FIG. 22, it is possible for every user to see the shared Bins 756 inside each User Folder, yet have non-shared space within his/her own "virtual view" of the Project to create and save unique "Settings" files 754 and to have unique "Trash" folder 757 and "Statistics" folder 758. Furthermore, the permissions on the Real User Folders (and thus on the symbolic links to these folders) are set such that the only user who can write items to the folder, or delete items from it, is the User who corresponds with the User Folder as shown in the "Owner" column of the Linux File Manager. Thus, when users open a Bin File from a User Folder that is not theirs, the users can only Read the Bin File and not Modify it or Overwrite it or Delete it or Remove it.

Figure 23:
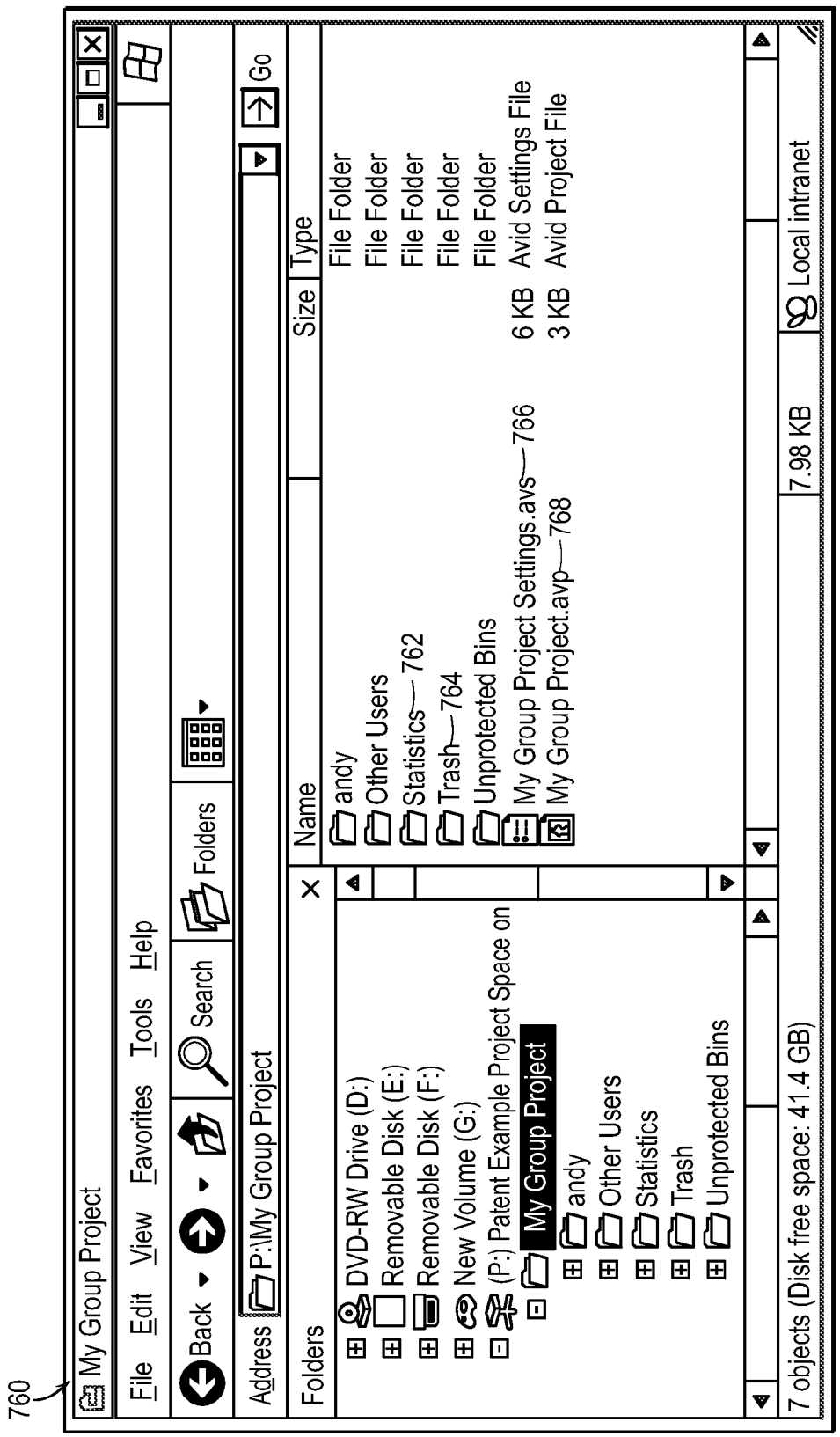
FIG. 23 depicts an example Windows Explorer® interface 760, showing how, at the operating system level on any workstation where an Avid® application is running, each user can have their own unique "Statistics" and "Trash" directories and their own "settings" files.

As now shown in FIG. 23, there is depicted an example Windows Explorer® interface 760, showing how, at the operating system level on any workstation where the Avid® application is running, each user can have their own unique "Statistics" 762 and "Trash" 764 directories (which are NOT symbolic links), as well as, their own "settings" files 766. Consequently, Avid® applications can come into conflict with one another if they try to use the same "Statistics" and "Trash" folders. Moreover, if more than one user tried to share the same settings file, each individual user would be unable to maintain his/her own customized settings (these settings determine many of the behaviors of the editing application). In fact, if two or more users were to share the same settings file, as each user made changes to his/her own settings, that would overwrite and supercede the settings that had been set by the previous user who modified the settings files. Advantageously, because of the way the shared project software module of the invention creates "virtual views" of each Avid® Project for each user who is a member of the Avid® Shared Project Space, the Trash and Statistics directories and the Settings file are NOT shared with other users. The only shared elements are the BIN files that are placed inside the "User Folders", e.g., the "Andy" folder that is at the top level of the Avid® Project, and the "user folders" ("Ellen", "janet" and "mark" that are inside "Other User").

Figure 24:
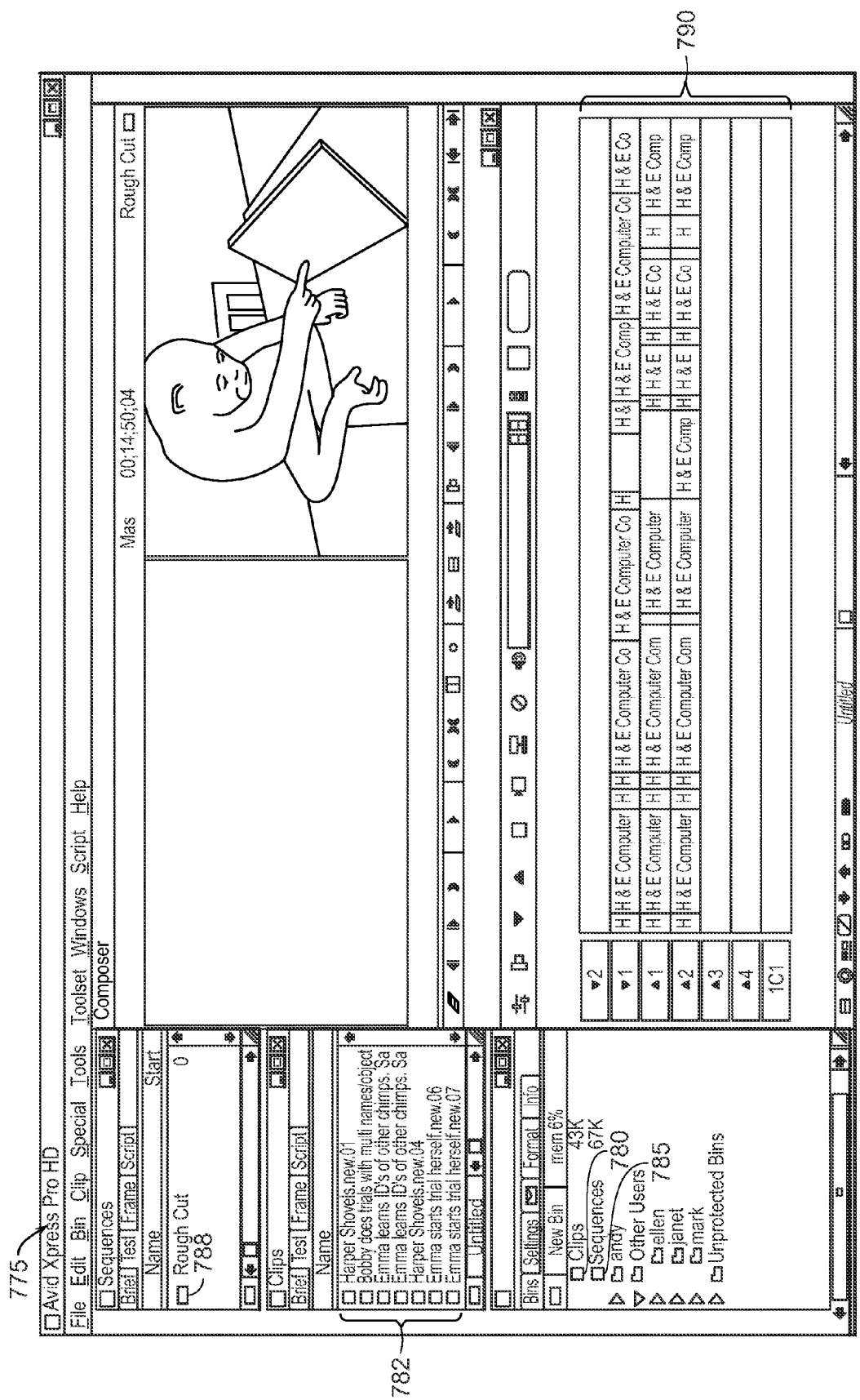
FIG. 24 depicts an example opened Avid® application interface showing for a user the creation of two Avid® Bins—one named "Clips" 780 and the other named "Sequences" 785.

Referring now to FIG. 24, there is depicted an example opened Avid® application interface 775 showing for user "Andy" the creation of two Avid® Bins—one called "Clips" 780 and the other called "Sequences" 785. Inside the "Clips" Bin 780, there are a number of master clips 782, each of which represents a particular piece of media. Inside the "Sequences" Bin 785 is one item called "Rough Cut" 788, which is a Sequence consisting of references to entire clips or parts of clips all strung together. The same sequence is represented graphically in the timeline 790 depicted via the interface 775. Implementing the system of virtual views and symbolic links that the shared project software module creates for sharing Avid® Projects according to the present invention, because the two Bins 780, 785 as shown are outside any User Folders (e.g., Andy, Ellen, Janet or Mark), those Bins will not be viewable to any other editors besides "Andy". Thus, it is possible for an editor to maintain some level of privacy (i.e., by having un-shared Bins) while working within a Shared Avid Project on the system.

Figure 25B:
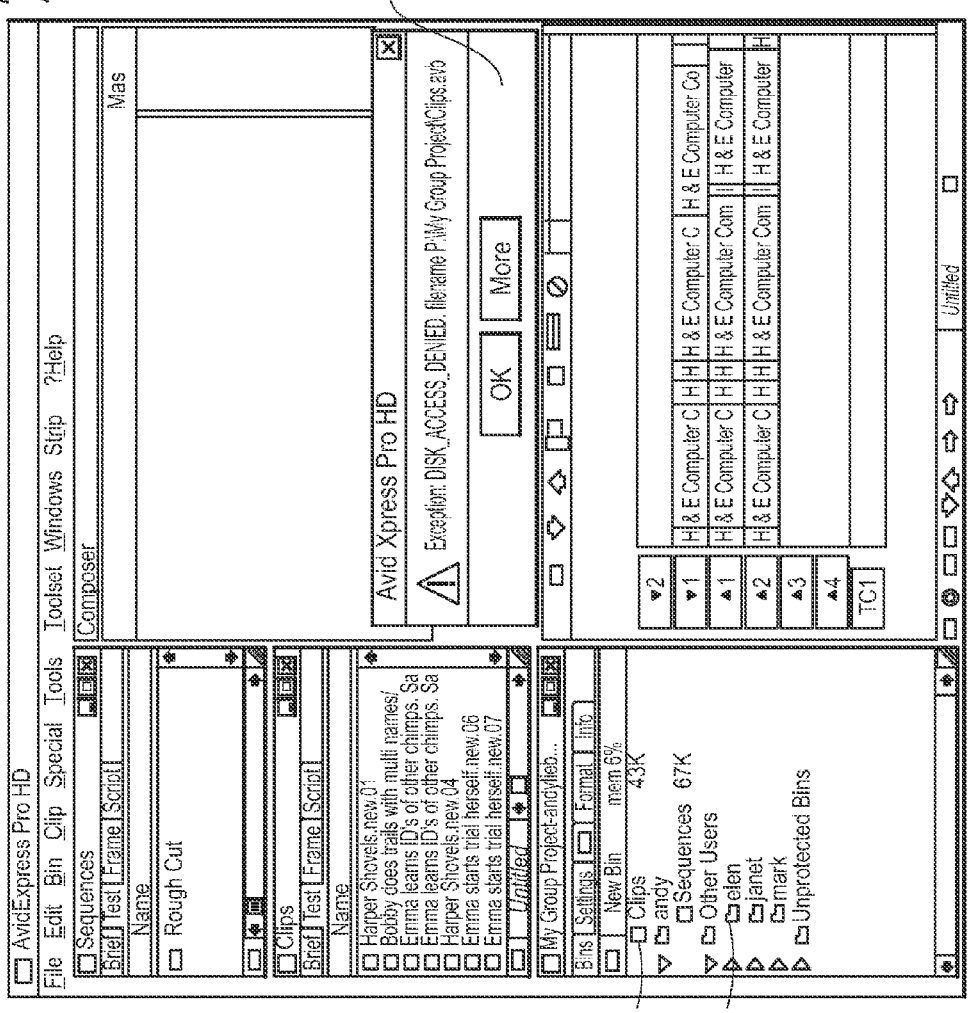
FIGS. 25A and 25B depict that portion 776 of the example opened Avid® application interface 775 depicted in FIG. 24 showing how a user can make a Bin available to other editors (FIG. 25A) and how a user is prevented from moving a Bin directly into another editor's folder (FIG. 25B)
Figure 25A:
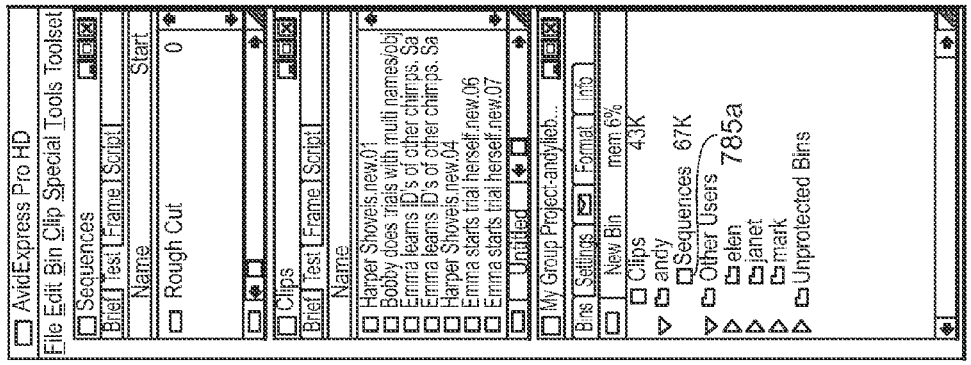

As shown in the FIG. 25A depicting that portion 776 of the example opened Avid® application interface 775 depicted in FIG. 24, a user "Andy" can make his Bin named "Sequences" available to other editors simply by moving "Sequences" into the "Andy" folder. This is accomplished, for example, by dragging and dropping the Bin 785 to the desired folder Other editors will now see this "Sequences Bin" 785a inside the directory path "/Other Users/Andy".

The Shared Avid® Projects system of the present invention prevents editors from moving any Bins into the folders of Other Users. Similarly, editors are not permitted to move any Bins out of Other Users' folders. Thus, in the example described, as depicted in FIG. 25B, when the user, e.g., "Andy", attempts to drag the "Clips" Bin 780 into the "Ellen" folder 781, the user "Andy" receives a "DISK_ACCESS_DE-NIED" exception message 789 when trying to move the "Clips Bin" into the "Ellen" folder, because in the system for sharing Avid® Projects, "Andy" does not have "write access" to the "Ellen" folder. It is understood that the same protection of User Folders is provided at the Operating System level.

Thus, referring to example scenario described with respect to FIG. 25B, if the user "Andy" tries to move the "Clips Bin" (e.g., a file Clips.avb) into a "Ellen" folder via a Windows Explorer® interface (not shown), "Andy" will receive an Access Denied message from the Windows OS or, similarly, an error message would be received at the OS Level in Apple's OS X.

Figures 26A, 26B:
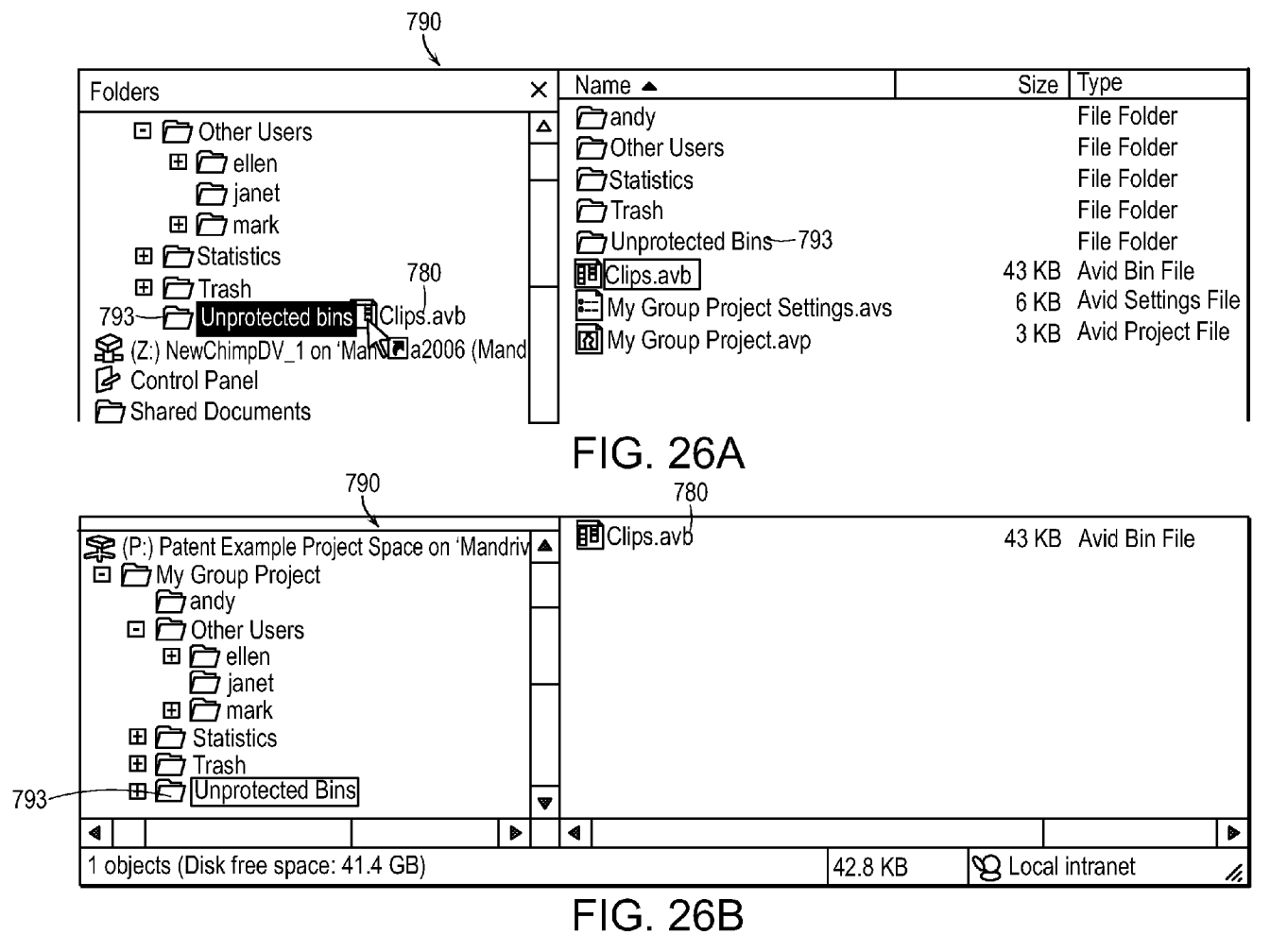
Figure 27:
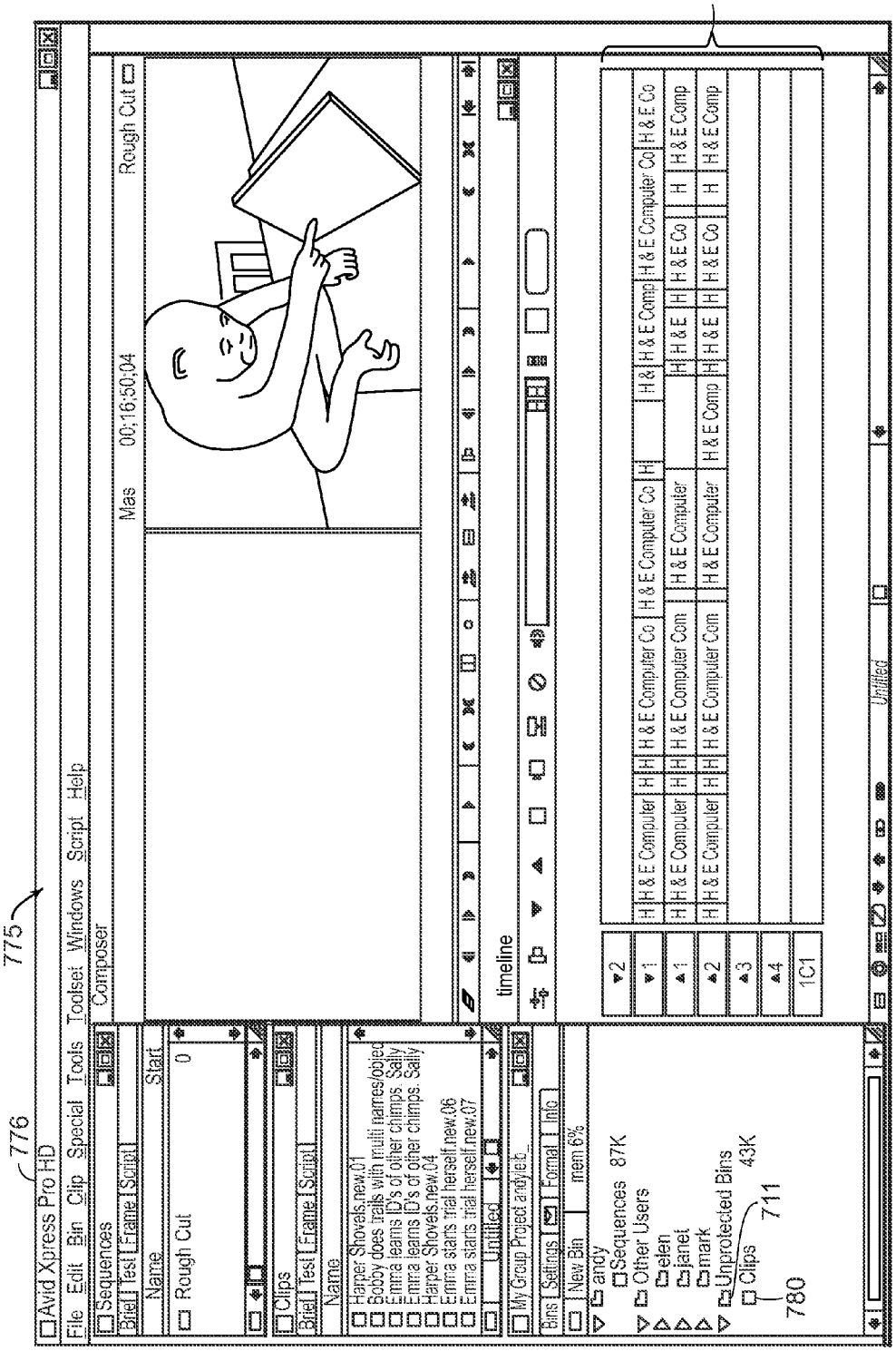
FIG. 27 illustrates the example opened Avid® application interface 775 showing that the User "Andy" has moved the Bin "Clips" 780 into "Unprotected Bins" from within the Avid application.

As depicted in FIGS. 26A and 26B, the Shared Avid® Projects system of the present invention does provide editors with the ability to transfer control of a Bin 780 from one User to another. At the OS Level, depicted by the Windows Explorer view 790 depicted in FIGS. 26A and 26B, this may be performed by dragging and dropping a Bin to an "Unprotected Bins" directory location 793, a symlink to a folder on the Linux Server to which all editors who are members of the "Shared Project Space" have Read/Write access. Any editor can place Bins in "Unprotected Bins", and any editor can take Bins out of "Unprotected Bins" folder 793. Thus, by using this folder as an "exchange point", editors can transfer ownership of a Bin from one user to another. The same actions can be performed from within the Avid® Application, as is depicted in FIG. 27 which illustrates the example opened Avid® application interface 775 showing that the User "Andy" has moved the Bin "Clips" 780 into "Unprotected Bins" folder 711 from within the Avid® application. At this point, any other editor can take the Bin and move it to his/her own User Folder. Once the Bin resides again in a User Folder, only that User will be able to delete or modify the Bin.

Figure 28:
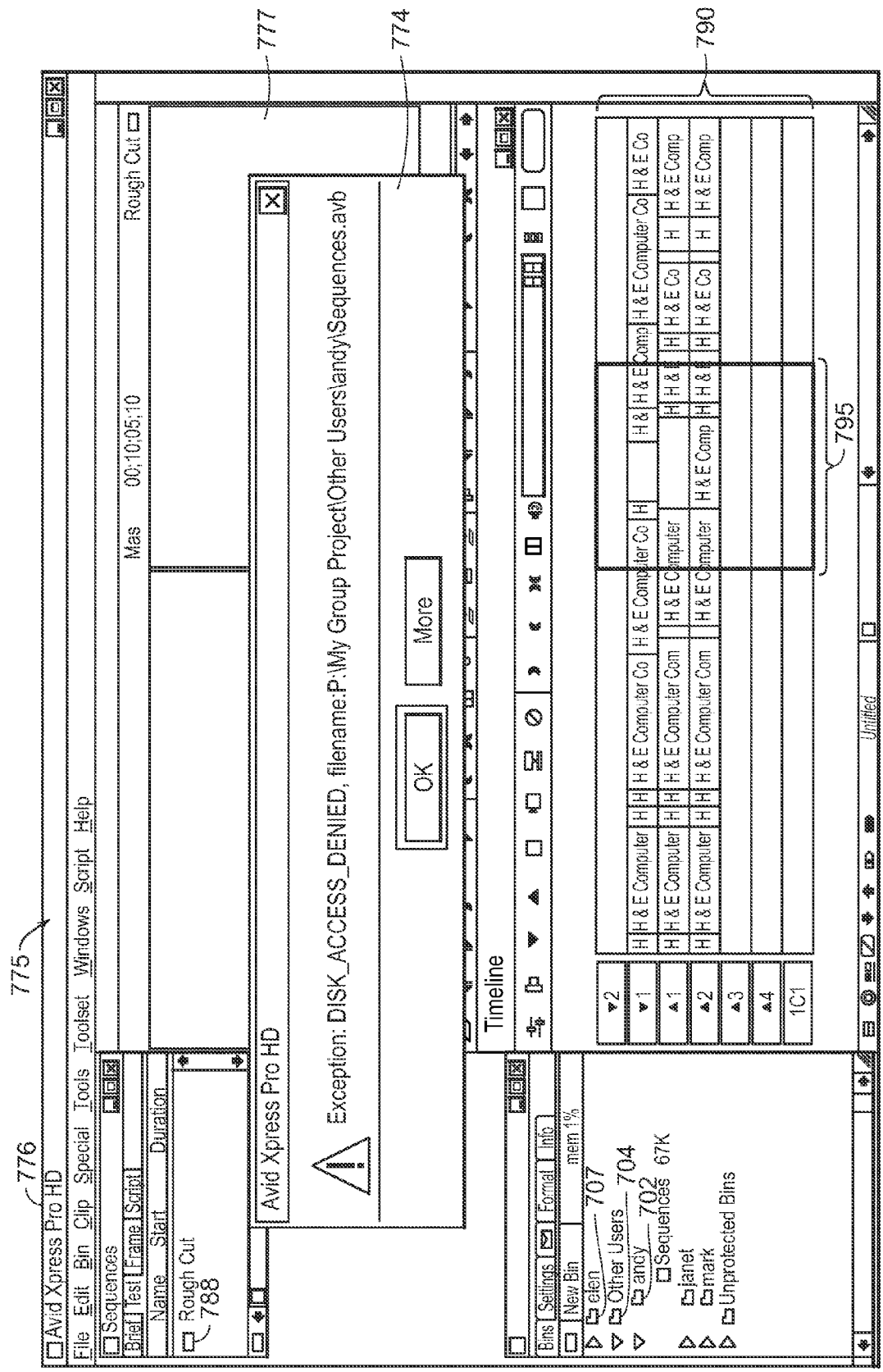
FIG. 28 illustrates the example opened Avid® application interface 775 providing a "virtual view" of the Avid® Project "My Group Project" that a user would be presented with when accessing the Project.

Referring to FIG. 28, there is provided a "virtual view" of the Avid® Project "My Group Project" that the user "Ellen" would get when she accessed the Project. Notice that the User folder "Ellen" 707 is at the top level of the folder hierarchy and now the User folder "Andy" 702 is inside "Other Users" 704. The variable arrangement of User Folders, depending on which User is looking at the Project, is made possible by the "symbolic link" scheme of the invention that allows the shared project software module to arrange a fixed set of folders in many different ways by arranging "links" to the folders and not the folders themselves; each set of links can be arranged in a custom-tailored way for each user. In FIG. 28, the User "Ellen" has opened up the "Sequences" Bin 785 from the "Andy" folder 702, and furthermore has opened up the "Rough Cut" sequences 788 which is what is displayed on the timeline 790 and in the right hand "monitor" 777 of the Avid® editing interface 775. Ellen might simply be interested in seeing what Andy edited. But in this case, Ellen has marked "In" and "Out" points on the timeline 790, as illustrated by the shaded area representing a video clip portion 795 on the timeline. Her potential intent is to cut the shaded area out of the timeline—and thus to modify the "Rough Cut" sequence 788. The Shared Avid® Projects system does not interfere with the example editor "Ellen" deleting the shaded area 795. However, editor Ellen cannot Save her changes—at least, she cannot change the information that was stored in Andy's "Rough Cut" Bin.

That is, in the example described herein, after deleting the selected video clip portion 795, if the editor "Ellen" tries to Save her changes, i.e., if user "Ellen" tries to modify the Bin that she opened up from the "Andy" User Folder—a Standard "Access is Denied" error message 774 from Avid® will be displayed that the Bin is locked for writing and that her changes will not be saved. Thus, the User "Andy" cannot have his "creative work" (in this case, his Bin) modified by another User. It is understood that the system and method for managing NLE video editing projects according to the invention has not in any way modified the Avid® editing applications to achieve such features and that the error messages generated by Avid would be one normally generated and presented to a user who tried to modify a Bin that was Read Only. The present invention has simply manipulated the permissions of Bins so that the work of Users is protected yet available for others to see.

Figure 29:
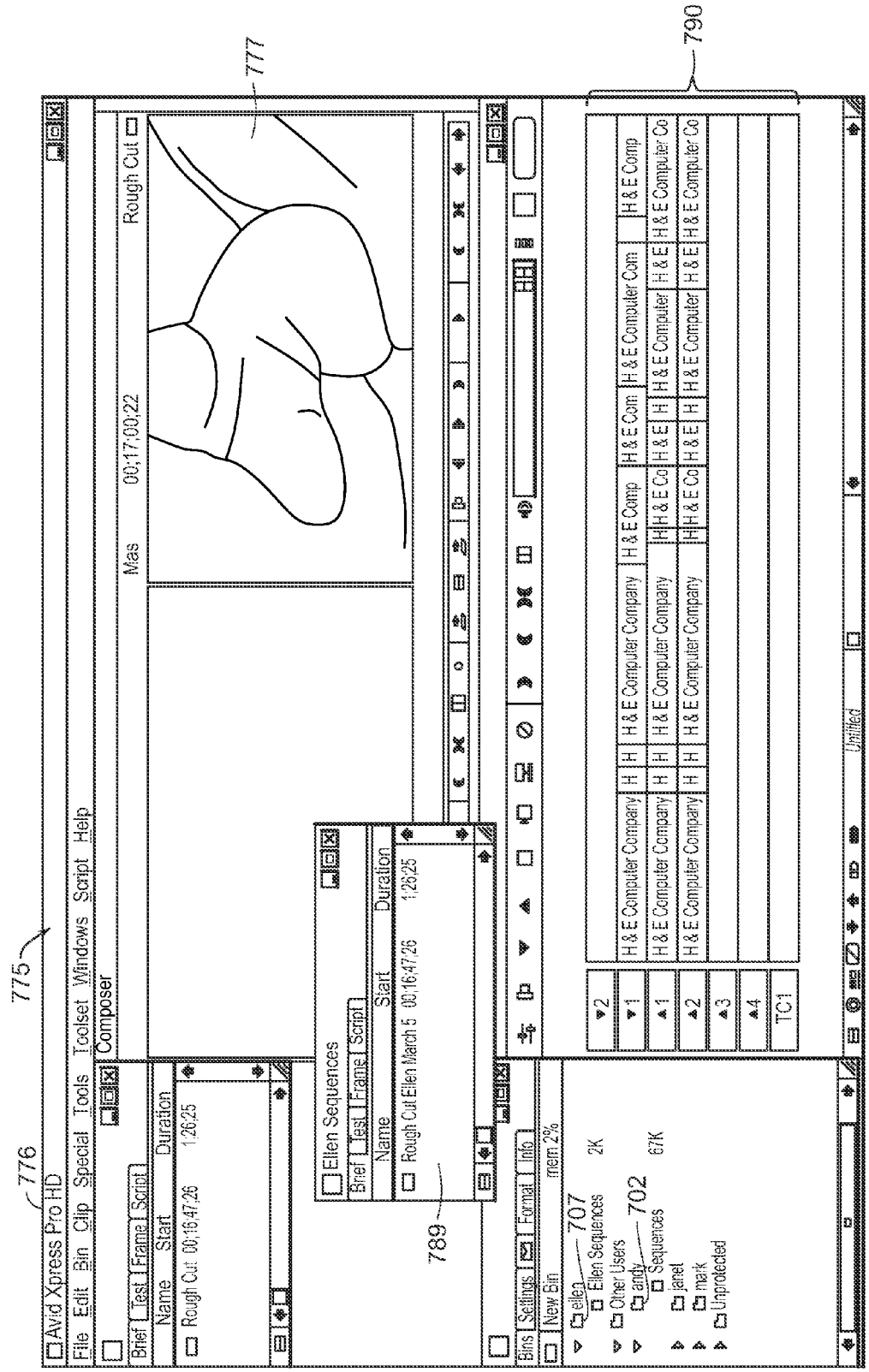
FIG. 29 depicts the example opened Avid® application interface 775 and how the system provides a way for a first user to save the changes she made to a sequence that was opened from another user's Bin by creating a new Bin for the first user, and copying the modified sequence into that new Bin.
Figure 31:
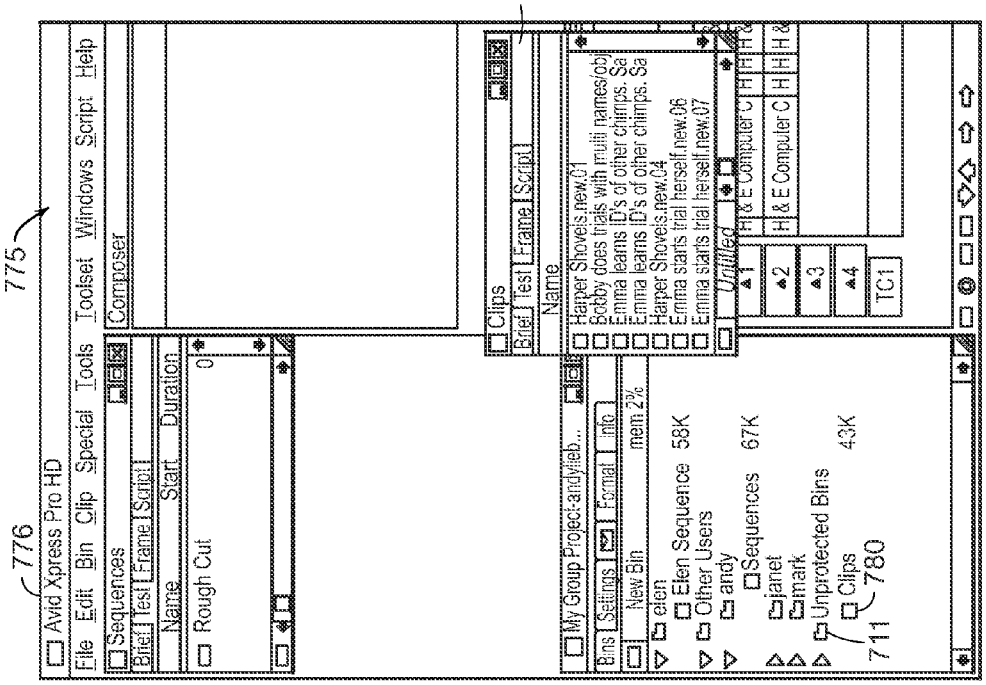

Continuing to the example opened Avid® application interface 775 depicted in FIG. 29, the system provides a way for the user "Ellen" to save the changes she made to the "Rough Cut" sequence that she opened from "Andy's Bin". By creating a new Bin of her own, e.g., "Ellen Sequences" Bin 789, and copying the modified sequence into her own Bin, that user (e.g., Ellen) can save her own version of the sequence. As long as "Ellen" places that new Bin inside her own User Folder 707, then if another user, e.g., "Andy", wants to see the changes, in the example illustrated, the sequence may be opened up from "Other Users/Ellen" in Andy's own virtual view of "My Group Project". It is understood that, if Ellen were to place the New Bin outside of her User Folder 707, Andy would not be able to view the changes that Ellen made.

Figure 30:
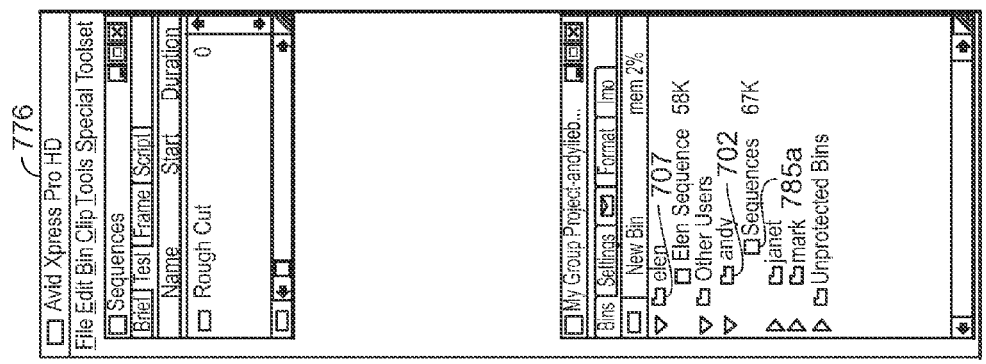
FIG. 30 depicts how a first user's attempt to take (drag and drop) a highlighted Bin from another user's folder and drag it to the first user's folder is not permitted; and, FIG. 31 depicts how editors can pass the ownership of a first user's Shared project Bin to a different (second) User.

In a shared Avid® Project such as the example "My Group Project" described herein, users cannot simply take a bin from another user. For example, as shown in the FIG. 30 depicting that portion 776 of the example opened Avid® application interface 775 depicted in FIG. 29, a user, e.g., Ellen, that attempts to take (drag and drop) the highlighted "Sequences" Bin 785a from "Andy" folder 702 and drag it to the "Ellen" folder 707 will not be permitted to do this and the Avid® application will cause a DISK_ACCESS_DENIED exception message to be displayed (not shown). However, FIG. 31 does depict how editors can pass the ownership of an Avid® Bin to a different User. In this case, the user "Andy" has taken (dragged and dropped) the "Clips Bin" 780 and put it in "Unprotected Bins" folder 711 within the Avid® application. The user Ellen is now free to take that Bin out of "Unprotected Bins" and put it in her own "Ellen" folder (where now only she can modify the Bin, but others can still see it); or, alternatively, put it outside of the folder structure so that only user Ellen can see the Clips Bin 780.

As described herein, use of the symbolic links are integral for giving a user (editor) his/her own "virtual view" of an Avid® Project. Having a "virtual view" allows each user to: 1) maintain his/her own settings for the Project; 2) maintain his/her own Trash and Statistics folders; 3) see his/her own name at the top of the folder hierarchy and other users inside "Other Users" folder. However, what protects one User from modifying Bins that belong to other users, as enabled by the present invention, requires the setting of Linux directory permissions in the context of Avid® Projects so that only the User who "owns" the "User Folder" can modify, overwrite, add to or delete the contents of the folder. The present invention enables the setting up of a system that automatically creates a "Logical and Managed User Folder" structure inside a normal Avid® Project, where the folders have the correct ownership and permissions—thus transforming a normal Avid® Project into a Shared Avid Project.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described my invention, what I claim as new, and desire to secure by Letters Patent is:

1. A computer implemented method for managing digital media files in a system including a computer server that is in communication with a storage device, the method comprising:
providing, using at least one processor, a user directory in which a user is enabled to store digital media files;
receiving an instruction to move and moving, using at least one processor, a first digital media file from the user directory to a shared directory having a location that is not directly accessible to the user, thereby preventing direct access by the user to the first digital media file; and
generating in the user directory, using at least one processor, a link to the first digital media file, the link providing the user indirect access to the first digital media file located in the shared directory;
wherein if the link to the first digital media file is deleted from the user directory, the first digital media file is not deleted from the shared directory until the system subsequently receives an additional instruction to delete files corresponding with previously deleted links and deletes the digital media file from the shared directory.

2. The computer implemented method of claim 1, further comprising providing, using at least one processor, a plurality of additional user directories, each of the plurality of additional user directories being provided for one of a plurality of additional users, wherein the shared directory has a location that is not directly accessible to any of the plurality of additional users.

3. The computer implemented method of claim 2, further comprising generating using at least one processor, in each of the plurality of additional user directories, a link to the first digital media file in such a way that a plurality of links to the first digital media file are generated, the plurality of links including the link in the user directory.

4. The computer implemented method of claim 3, wherein the plurality of links are generated at the same time or at different times.

5. The method of claim 1, further comprising:
subsequent to the link being deleted from the first user directory, receiving an additional instruction from a user with administrator authorization to delete any files corresponding with any previously deleted links;
based on the additional instruction, determining, using at least one processor, that the link has been deleted; and
based on the step of determining that the link has been deleted, deleting, using at least one processor, the first digital media file from the shared directory.

6. The method of claim 1, further comprising providing a hierarchical directory structure on the storage device for hierarchically organizing the first digital media file and other data files.

7. The method of claim 6, further comprising configuring, using at least one processor, the storage device as one or more workspaces, each of the one or more workspaces having an associated directory location in the hierarchical directory structure and logically separating digital media files for different projects on the storage device.

8. The method of claim 7, wherein the step of configuring the storage device as one or more workspaces further comprises setting a limit on at least one of the one or more workspaces, the limit specifying an amount of media storage space permitted to be occupied in the at least one workspace.

9. The method of claim 7, wherein the step of configuring the storage device as one or more workspaces further comprises, for each workspace of the one or more workspaces, creating a shared directory in the hierarchical directory structure that is logically located within that workspace.

10. The method of claim 1, wherein the step of moving the first digital media file from the user directory to the shared directory is performed based on a command to share the first digital media file, the command being issued by the user.

11. The method of claim 1, wherein the step of moving the first digital media file from the user directory to the shared directory is performed based on a command to share the first digital media file, the command being issued by a user with administrator authorization.

12. The method of claim 1, wherein the user directory is visible on a network in such a way that the user is enabled to see the user directory.

13. The method of claim 1, wherein the user is enabled to capture, add to, edit, view, transcode, encode, and decode digital media, and wherein digital media that is captured or added to is stored in the user directory.

14. The method as claimed in claim 1, further comprising:
refreshing media in the user directory by comparing, using at least one processor, the names of digital media files in the shared directory to the names of links to digital media files in the user directory; and
creating, using at least one processor, a link in the user directory for each digital media file in the shared directory that does not have a corresponding link in the user directory.

15. A system, implemented by and including a computer server device that is in communication with a storage device and at least one processor, for managing access to digital media files stored on the storage device via the intermediary of the computer server device, the server device operatively coupled via a network connection with at least one user, the system comprising:
a user directory in which a user is enabled to store digital media files;
a shared directory having a location that is not directly accessible to the user in such a way that files stored in the shared directory are not directly accessible to the user;
a first digital media file located in the shared directory, the first digital media file having been moved to the shared directory from the user directory; and
located in the user directory, a link to the first digital media file providing the user with indirect access to the first digital media file;
wherein if the link to the first digital media file is deleted from the user directory, the first digital media file is not deleted from the shared directory until the system subsequently receives an additional instruction to delete files corresponding with previously deleted links and deletes the digital media file from the shared directory.

16. The system of claim 15, wherein media is refreshed in the user directory through a comparison of the names of links to digital media files in the user directory to the names of digital media files in the shared directory, and further wherein based on the comparison a link is created, in the user directory, to each digital media file in the shared directory that does not have a corresponding link in the user directory.

17. The system of claim 15, further comprising a hierarchical directory structure on the storage device for hierarchically organizing digital media files, other data files, or both.

18. The system of claim 17, wherein the storage device is configured as one or more workspaces, each of the one or more workspaces having an associated directory location in the directory structure, the one or more workspaces logically separating, on the storage device, digital media files for different projects.

19. The system of claim 18, further comprising a limit on at least one of the one or more workspaces, the limit specifying an amount of media storage space permitted to be occupied in the at least one of the one or more workspaces.

20. The system of claim 18, wherein the system comprises, for each workspace of the one or more workspaces, a shared directory in the hierarchical directory structure that is logically located within that workspace.

21. The system of claim 15, wherein the user directory is visible on a network in such a way that the user is enabled to see the user directory.

22. A program storage device that is readable by a machine, tangibly embodying a program of instructions executable by the machine to perform method steps for managing actual digital audio and video media files in a system having a computer server that is in communication with a storage device, said method steps comprising:
providing, using at least one processor, a user directory in which a user is enabled to store digital media files;
based on a received instruction to move, moving, using at least one processor, a first digital media file from the user directory to a shared directory having a location that is not directly accessible to the user, thereby preventing direct access by the user to the first digital media file; and
in the user directory, generating, using at least one processor, a link to the first digital media file, the link providing the user indirect access to the first digital media file located in the shared directory;
wherein if the link to the first digital media file is deleted from the user directory, the first digital media file is not deleted from the shared directory until the system subsequently receives an additional instruction to delete files corresponding with previously deleted links and deletes the digital media file from the shared directory.

* * * * *